(12) United States Patent
Carlson et al.

(10) Patent No.: US 7,134,459 B2
(45) Date of Patent: *Nov. 14, 2006

(54) METHODS AND APPARATUS FOR MIXING POWDERED SAMPLES

(75) Inventors: Eric Carlson, Cupertino, CA (US); Li Song, Cupertino, CA (US); Daniel M. Pinkas, Alameda, CA (US); Claus G. Lugmair, San Jose, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 10/860,113

(22) Filed: Jun. 3, 2004

(65) Prior Publication Data

US 2004/0261897 A1    Dec. 30, 2004

Related U.S. Application Data

(63) Continuation-in-part of application No. 10/460,521, filed on Jun. 12, 2003, now Pat. No. 6,805,175.

(51) Int. Cl.
*B65B 1/04* (2006.01)

(52) U.S. Cl. .................. 141/130; 141/67; 422/100; 406/16; 406/28

(58) Field of Classification Search ............ 141/1, 141/4–7, 59, 67, 130, 71, 81, 129, 83; 422/99, 422/100; 406/16, 17, 28–30
See application file for complete search history.

(56) References Cited

U.S. PATENT DOCUMENTS

| | | | |
|---|---|---|---|
| 2,540,059 A | 1/1951 | Stirn et al. | |
| 2,907,357 A | 10/1959 | Sandhage et al. | |
| 3,339,595 A | 9/1967 | Pechmann | |
| 3,656,517 A | 4/1972 | Taylor et al. | |
| 3,719,214 A | 3/1973 | Erndt | |
| 3,847,191 A | 11/1974 | Aronson | |
| 3,884,741 A | 5/1975 | Sexstone | |
| 4,123,175 A | 10/1978 | Carlson et al. | |
| 4,158,035 A | 6/1979 | Haase et al. | |
| 4,168,914 A | 9/1979 | Larson et al. | |
| 4,185,926 A | 1/1980 | Lyon | |
| 4,406,410 A | 9/1983 | Larson et al. | |

(Continued)

FOREIGN PATENT DOCUMENTS

FR    2 791 428 A1    9/2000

(Continued)

OTHER PUBLICATIONS

International Search Report for PCT/US2004/018833 dated Feb. 15, 2005, 7 pages.

(Continued)

*Primary Examiner*—Steven O. Douglas
(74) *Attorney, Agent, or Firm*—Senniger Powers

(57) ABSTRACT

Method for preparing a mixed powder sample by mixing two or more different powders comprising transferring a quantity of a first powder to a mixing vessel and transferring a quantity of a second powder to the mixing vessel to form a powder bed in the mixing vessel comprising the first and second powders. The quantities of the powders are selected so the mixed sample has a predetermined ratio of first powder to second powder. The powder bed is fluidized to mix the powders and produce a mixed sample. The mixed sample weighs about 5 grams or less. The invention also includes apparatus for preparing mixed powder samples by mixing two or more different powders.

53 Claims, 21 Drawing Sheets

U.S. PATENT DOCUMENTS

| | | | |
|---|---|---|---|
| 4,509,568 A | 4/1985 | Kawaguchi et al. | |
| 4,721,233 A | 1/1988 | Asada | |
| 4,820,056 A | 4/1989 | Rese | |
| 4,859,605 A | 8/1989 | Metzger et al. | |
| 4,949,766 A | 8/1990 | Coatsworth | |
| 4,974,646 A | 12/1990 | Martin et al. | |
| 5,002,103 A | 3/1991 | Marescalchi | |
| 5,018,909 A | 5/1991 | Crum et al. | |
| 5,055,408 A | 10/1991 | Higo et al. | |
| 5,339,871 A | 8/1994 | Collins et al. | |
| 5,727,607 A | 3/1998 | Ichikawa et al. | |
| 5,874,563 A | 2/1999 | Kim et al. | |
| 5,874,653 A | 2/1999 | Van Kruchten | |
| 5,879,755 A | 3/1999 | Takahashi et al. | |
| 5,959,297 A | 9/1999 | Weinberg et al. | |
| 5,985,356 A | 11/1999 | Schultz et al. | |
| 6,003,779 A | 12/1999 | Robidoux | |
| 6,004,617 A | 12/1999 | Schultz et al. | |
| 6,030,917 A | 2/2000 | Weinberg et al. | |
| 6,063,633 A | 5/2000 | Willson, III | |
| 6,065,508 A | 5/2000 | Ball et al. | |
| 6,087,181 A | 7/2000 | Cong | |
| 6,149,882 A | 11/2000 | Guan et al. | |
| 6,175,409 B1 | 1/2001 | Nielsen et al. | |
| 6,605,256 B1 | 8/2003 | Güller et al. | |
| 6,620,243 B1 | 9/2003 | Bertellotti et al. | |
| 6,677,162 B1 | 1/2004 | Wendelbo et al. | |
| 6,684,917 B1 | 2/2004 | Zhu et al. | |
| 6,727,096 B1 | 4/2004 | Wang et al. | |
| 6,805,175 B1 * | 10/2004 | Pinkas et al. | 141/130 |
| 2002/0014546 A1 | 2/2002 | Lugmair et al. | |
| 2002/0042140 A1 | 4/2002 | Hagemeyer et al. | |
| 2002/0045265 A1 | 4/2002 | Bergh et al. | |
| 2002/0048536 A1 | 4/2002 | Bergh et al. | |
| 2002/0081708 A1 | 6/2002 | Punnonen et al. | |
| 2002/0088017 A1 | 7/2002 | Kellems et al. | |
| 2002/0117453 A1 | 8/2002 | Cook et al. | |
| 2002/0170976 A1 | 11/2002 | Bergh et al. | |
| 2003/0165488 A1 | 9/2003 | Kletzien et al. | |
| 2003/0166557 A1 | 9/2003 | Minna et al. | |
| 2003/0198954 A1 | 10/2003 | Bejanin et al. | |
| 2003/6204017 | 10/2003 | Stevens et al. | |
| 2003/0211514 A1 | 11/2003 | Penninger et al. | |
| 2003/0215801 A1 | 11/2003 | Pieken et al. | |
| 2003/0219906 A1 | 11/2003 | Giaquinta et al. | |
| 2004/0077094 A1 | 4/2004 | Akporiaye et al. | |
| 2004/0114462 A1 | 6/2004 | Schunk et al. | |

FOREIGN PATENT DOCUMENTS

| | | |
|---|---|---|
| WO | WO 00/09255 | 2/2000 |
| WO | WO 00/14529 | 3/2000 |
| WO | WO 00/17413 | 3/2000 |
| WO | WO 00/51720 | 9/2000 |
| WO | WO 00/059627 A1 | 10/2000 |
| WO | WO 01/033176 A1 | 5/2001 |
| WO | WO 02/029369 A1 | 4/2002 |
| WO | WO 02/070121 A1 | 9/2002 |
| WO | WO 03/014732 A1 | 2/2003 |
| WO | WO 03/026965 A1 | 4/2003 |
| WO | WO 03/066436 A1 | 8/2003 |

OTHER PUBLICATIONS

Argonaut Technologies, *Argonaut—Products—Lead Discovery—Redi*, http://www.argotech.com/products/lead_discovery/redi.html, Aug. 27, 2002, 1 page.

Argonaut Technologies, *Argonaut—Products— Lead Discovery—Redi Specifications*, http://www.argotech.com/products/lead_discovery/redi_specs.html, Aug. 27, 2002, 2 pages.

Argonaut Technologies, *Argonaut—Products—Lead Discovery—Redi Configuration Options*, http://www.argotech.com/products/lead_discovery/redi_config.html, Aug. 27, 2002, 2 pages.

Argonaut Technologies, *Argonaut—Products—Lead Discovery—Calli and Moss*, http://www.argotech.com/products/lead_discovery/calli.html, Aug. 27, 2002, 1 page (second page missing).

Argonaut Technologies, *Argonaut—Products—Lead Discovery—Calli and Moss Specifications*, http://www.argotech.com/products/lead_discovery/calli_specs.html, Aug. 27, 2002, 2 pages.

Bryant, et al., *Advances in Powder-Dosing Technology*, Innovations in Pharmaceutical Technology, Jun. 2002, 7 pages.

CHEMSPEED, *Chemspeed Laboratory Instruments and Services for Scientists*, http://www.chemspeed.com/acceleratordds.html, Aug. 27, 2002, 2 pages.

CHEMSPEED Fluka, Mar. 2002, 2 pages.

MERIDICA, *Microcrystalline Cellulose fill weights on the Xcelodose™ system*, Jan. 14, 2002, 9 pages.

MERIDICA, *Evaluation of a Solid Dose Delivery Technology for Filling Capsules and Other Small Containment Systems with a Broad Range of Drug Substance and Carriers*, Apr. 2002, 5 pages.

Mettler Toledo, *FlexiWeigh Automated Powder Dispensing*, 2 pages, no date.

San Diego Scientific Instruments, Inc., Apr. 2004, 3 pages.

Schering-Plough Research Institute, Adaptive Powder Dispensing System, date at least as early as Mar. 3, 2003, 1 page.

* cited by examiner

METHODS AND APPARATUS FOR MIXING POWDERED SAMPLES

CROSS REFERENCE TO RELATED APPLICATION

This application is a continuation-in-part of commonly assigned U.S. application Ser. No. 10/460,521 filed Jun. 12, 2003 now U.S. Pat. No. 6,805,175.

BACKGROUND OF THE INVENTION

This invention relates generally to powder handling apparatus and methods, and more particularly to a system for efficient preparation and handling of powdered mixtures.

Automated powder dispensing systems are used in many laboratory and commercial applications. In the pharmaceutical industry, for example, such systems are used to fill capsules with small but accurate doses of drugs, typically using gravimetric or volumetric techniques. These systems suffer various disadvantages, including an inability to handle a wide range of particulate materials at optimal speeds and accuracies, particularly when very small doses are involved (e.g., 20 mg or less). Further, the operation of conventional systems tends to crush the particles being handled.

Automated powder handling systems also have application to combinatorial (high-throughput) research. For example, they can be used for combinatorial catalysis research where catalyst candidates are evaluated using various screening techniques known in the art. See, for example, U.S. Pat. No. 5,985,356 to Schultz et al., U.S. Pat. No. 6,004,617 to Schultz et al., U.S. Pat. No. 6,030,917 to Weinberg et al., U.S. Pat. No. 5,959,297 to Weinberg et al., U.S. Pat. No. 6,149,882 to Guan et al., U.S. Pat. No. 6,087,181 to Cong, U.S. Pat. No. 6,063,633 to Willson, U.S. Pat. No. 6,175,409 to Nielsen et al., and PCT patent to Willson, U.S. Pat. No. 6,175,409 to Nielsen et al., and PCT patent applications WO 00/09255, WO 00/17413, WO 00/51720, WO 00/14529, each of which U.S. patents and each of which PCT patent applications, together with its corresponding U.S. application(s), is hereby incorporated by reference in its entirety for all purposes.

The efficiency of a combinatorial chemistry discovery program is, in general, limited by rate-limiting steps of the overall process work flow. One such rate-limiting step has been the mechanical pretreatment and handling of catalyst candidates after synthesis but before screening. U.S. application Ser. No. 902,552, filed Jul. 9, 2001 by Lugmair, et al., published Feb. 7, 2002 as Pub. No. US 2002/0014546 A1, and assigned to Symyx Technologies, Inc., incorporated herein by reference in its entirety for all purposes, is directed to more efficient protocols and systems for effecting the mechanical treatment of materials, and especially, mechanical treatment of catalysis materials such as heterogeneous catalysts and related materials. The disclosed protocols provide an efficient way to prepare catalysis materials having a controlled particle size for optimal screening. However, the handling and transfer of such powders from one location to another as they are prepared for screening and ultimately delivered to the screening device (e.g., a parallel flow reactor) is not addressed in detail. The circumstances are similar in the pharmaceutical industry. For example, processes used to screen one or more excipients (i.e., diluents, pH modifiers, viscosity modifiers, stabilizers, flavorings, colorings, fillers and combinations thereof) for suitability for use with one or more active pharmaceutical ingredients can involve preparation and handling of powdered samples. Commonly assigned U.S. application Ser. No. 10/790,956 entitled "Evaluating Effects of Exposure Conditions on Drug Samples Over Time" filed Mar. 1, 2004, hereby incorporated by reference in its entirety for all purposes, describes forced degradation testing of excipients. That disclosure sets forth detailed analytic methods for using combinatorial chemistry to screen powdered excipients, but does not address powder handling in detail. Similar methods can be used to screen the compatibility of one powdered active ingredient with one or more other powdered active ingredients. Likewise, combinatorial chemistry can be applied to the creation and testing of various powdered polymorphs of drug candidates, such as is described in commonly assigned PCT application No. WO 03/014732, hereby incorporated by reference in its entirety for all purposes. That disclosure refers to screening powdered samples without discussing any powder handling systems in detail.

In some cases two or more different powders, such as an active ingredient and one or more excipients, are mixed together for further analysis. Many powder handling systems are based on the premise that any powdered ingredients in a sample will be dissolved in a solution, thereby obviating the need to mix powdered ingredients in their powdered form. But some research requires the powders to be maintained in solid form for testing. For example, a powdered mixture may be formed into a tablet for pharmaceutical testing. It may also be desirable to maintain a powdered mixture in solid form to conduct various spectroscopic, X-ray, or other solid-phase analyses.

A stirrer, such as the end of a pipette, a stirring bar, or a milling ball can be used to mix powders. Unfortunately, removal of the stirrer after mixing can alter the sample composition because one powder may have more or less affinity for the stirrer than other powders in the sample. Consequently, removal of the stirrer risks disproportionate removal of one or more powders in a residue on the stirrer. When the sample size is small, as is typically the case in combinatorial chemistry, the problem is exacerbated because disproportionate removal of relatively smaller amounts of powder significantly alters the overall sample composition. Thus, it is common practice to leave at least the portion of the stirrer that contacts the powder in the sample to avoid removal of any residue. For example, the tip of a pipette can be broken off and left in the sample container. Likewise, stirring bars and milling balls are often left in the sample after mixing. Not only does this consume the stirrer, but there is also a chance that the continuing presence of the stirrer could affect the sample analysis or limit the types of analyses that can be performed. Furthermore, if mixed powder samples are to be pressed into tablets for ingestion (e.g., in a pharmaceutical trial), it would be preferable not to have foreign objects like milling balls and pipette tips in the tablets.

Similar rate limiting steps and/or the need to mix powders can arise whenever a process requires preparation and handling of powdered materials. This can be the case during synthesis or screening of pharmaceuticals and catalysts (as already mentioned) as well as agricultural chemicals, pigments, and flavorings to name just a few of the other applications for powder handling systems.

SUMMARY OF THE INVENTION

One aspect of the invention is directed to a method of preparing a sample by mixing two or more different powders. The method comprises the steps of transferring a quantity of a first powder to a mixing vessel and transferring a quantity of a second powder different from the first powder to the mixing vessel to form a powder bed in the vessel comprising the first and second powders. The method includes the step of fluidizing the powder bed to mix the powders. The resulting mixed sample weighs about 5 grams or less. The quantities of first and second powders are also selected so the mixed sample has a predetermined ratio of first powder to second powder.

Another aspect of the invention is a powder handling system for preparing at least one sample by mixing two or more powders. The system includes at least one mixing vessel having a total volumetric capacity of about 50 ml or less. The mixing vessel has an open end and a closed end. The system further includes a powder transfer system for transferring quantities of two or more different powders to the mixing vessel to form an unmixed powder bed in the mixing vessel comprising the powders. The system also includes a powder bed fluidizing apparatus for fluidizing the powder bed to mix the powders and produce a mixed sample in the mixing vessel and a removable closure adapted for closing the open end of the mixing vessel during mixing of the powders.

Another aspect of the invention is a powder handling system for preparing at least one sample by mixing two or more powders. The system includes at least one mixing vessel having a maximum capacity of about 5 grams of powder or less. The mixing vessel has an open end and a closed end. The system further includes a powder transfer system for transferring quantities of two or more different powders to the mixing vessel to form an unmixed powder bed in the mixing vessel comprising the powders. The system also includes a powder bed fluidizing apparatus for fluidizing the powder bed to mix the powders and produce a mixed sample in the mixing vessel and a removable closure adapted for closing the open end of the mixing vessel during mixing of the powders.

Other objects and features will be in part apparent and in part pointed out hereinafter.

BRIEF DESCRIPTION OF THE DRAWINGS

Corresponding parts are designated by corresponding reference numbers throughout the drawings.

DETAILED DESCRIPTION OF PREFERRED EMBODIMENTS

Figure 1:
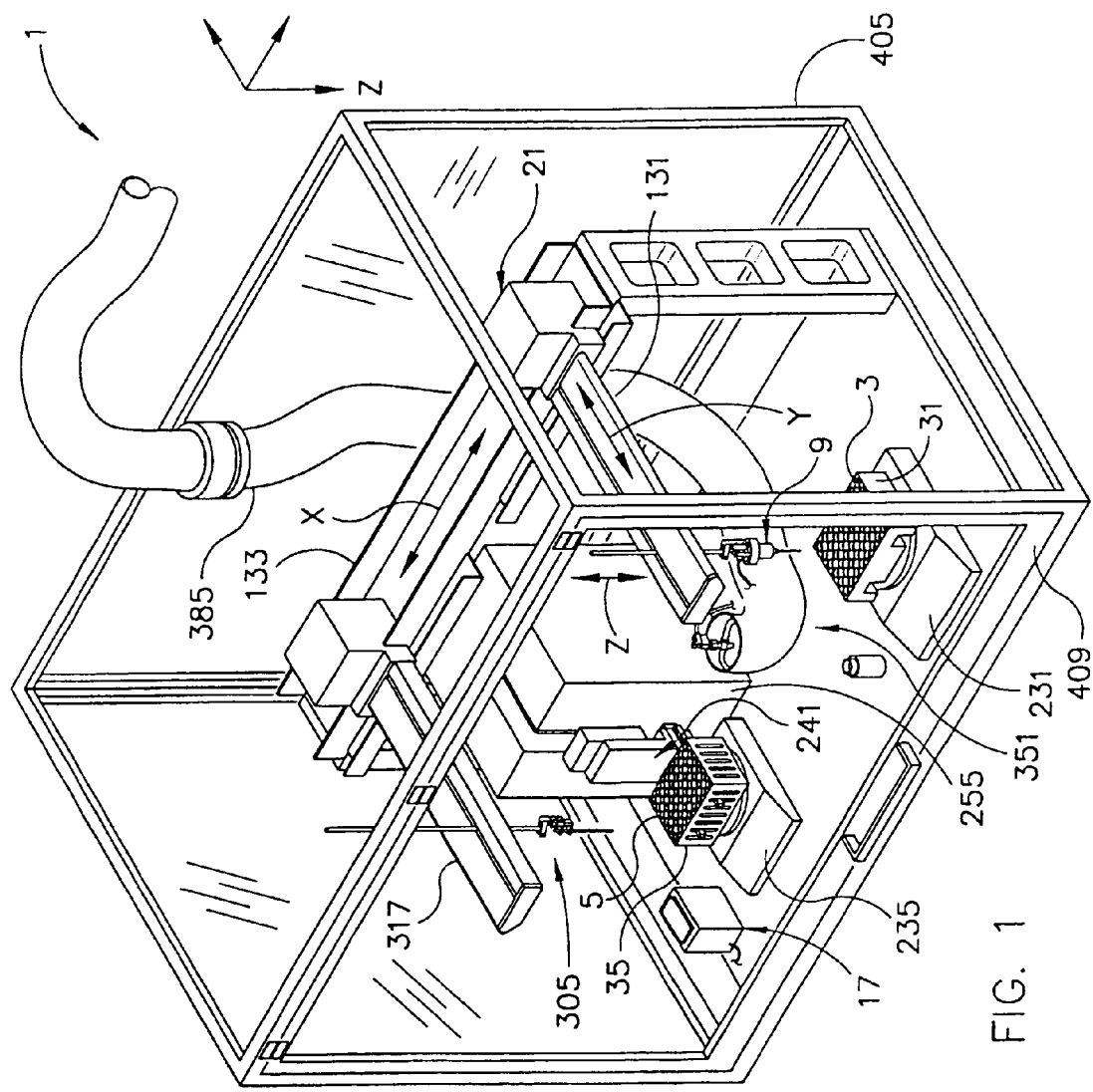
FIG. 1 is a perspective of one embodiment of powder transfer apparatus of the present invention.
Figure 1:
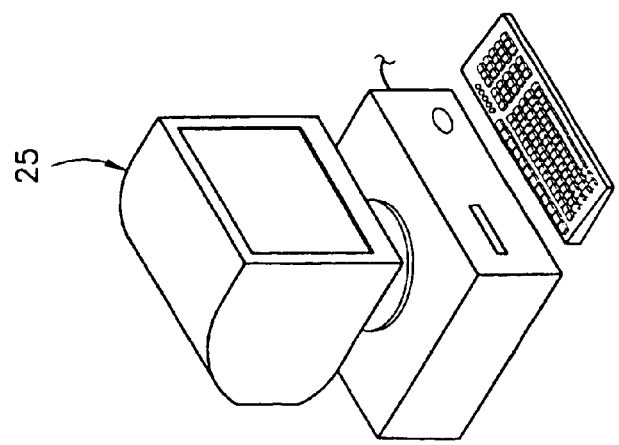
Figure 2:
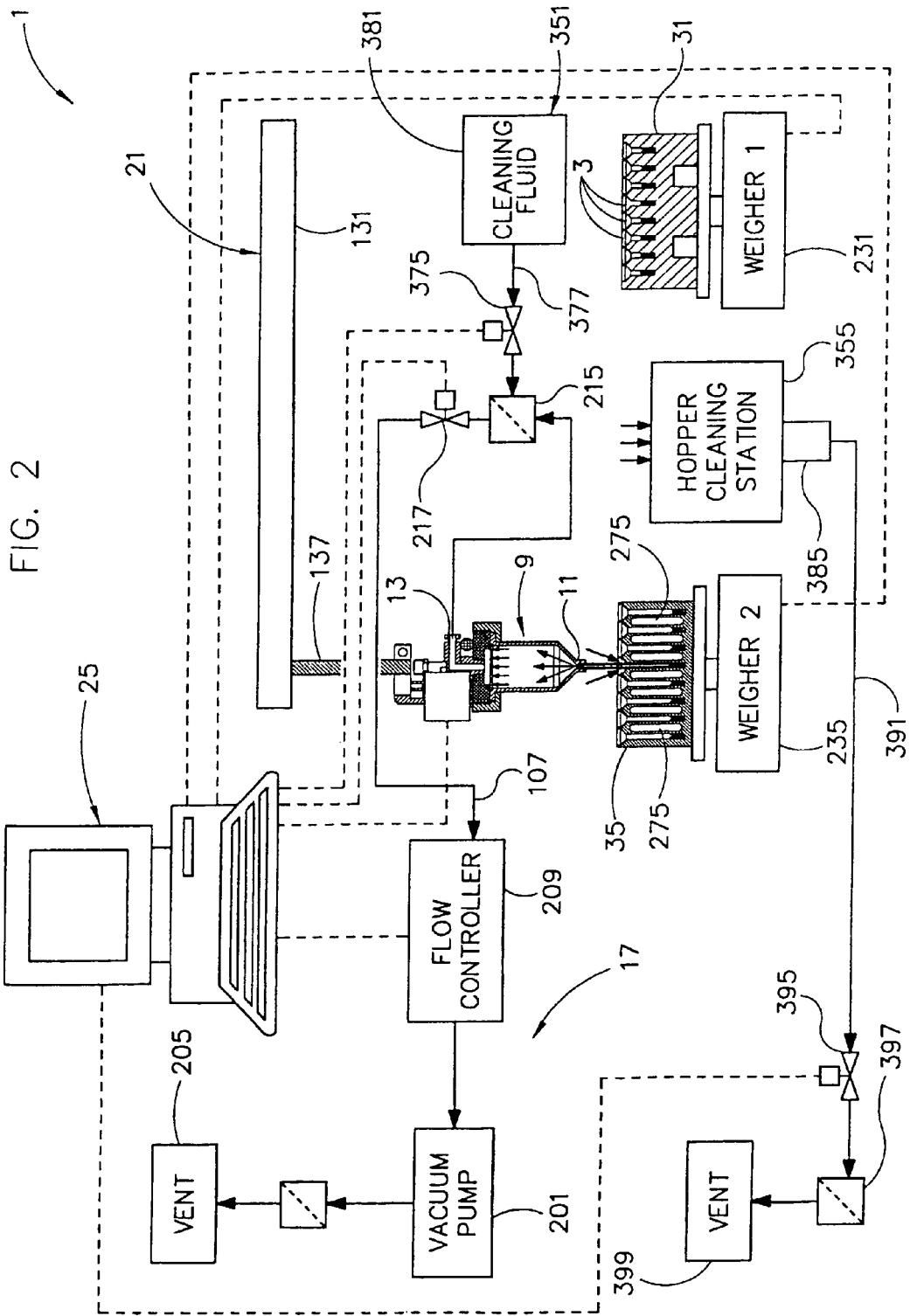
FIG. 2 is a diagrammatic view showing various components of the apparatus.

Referring to FIGS. 1 and 2, one embodiment of a powder transfer system of the present invention is designated in its entirety by the reference numeral 1. In general, the system is adapted for transferring powder (e.g., catalysis materials) from one or more sources 3 to one or more destination receptacles 5. As used herein, the term "powder" includes particles having a particle size distribution with a mean particle size ranging from about 10 nm to about 1 mm, and especially from about 1 µm to about 500 µm.

The components of the system 1 include a hopper, generally indicated at 9, having a powder transfer port 11 and a suction port 13, and a gas flow control system, generally designated 17, which connects to the suction port of the hopper to establish an upward flow of air or other gas through the transfer port. A transport system, generally designated 21, is provided for transporting the hopper 9 between the one or more sources 3 and the one or more destination receptacles 5. As will be described in detail hereinafter, the gas flow control system 17 is operable to vary the upward flow of gas (e.g., air) through the transfer port 11 to have different velocities, namely, aspirating, transporting and dispensing velocities. The automated system operates under the control of a processor, generally designated 25 in FIGS. 1 and 2. This processor may be a programmable microprocessor or other suitable processing device.

In the particular embodiment of FIG. 1, the one or more sources 3 comprise an array of source wells (e.g., an array of 96 such wells) in a monolithic block 31 or other holder, and the one or more destination receptacles 5 comprise an array of destination wells (e.g., an array of 96 such wells) formed in a monolithic block 35 or other holder. The size and shape of the source and destination wells 3, 5 can vary. In one embodiment, the source wells 3 have an inside diameter of about 6 mm and a height of about 40 mm, and the destination wells 5 have an inside diameter of about 4 mm and a depth of about 40 mm. Further, vessels or receptacles of any type could be used in lieu of the wells 3, 5 shown in FIG. 1. Similarly, the number and arrangement of such vessels and receptacles forming the arrays can vary. As will be described, the system of this invention is able to accommodate different modes of transfer, including transfers involving one source to one destination receptacle (one-to-one), one source to multiple destination receptacles (one-to-many), or multiple sources to multiple destination receptacles (many-to-many).

Figure 3:
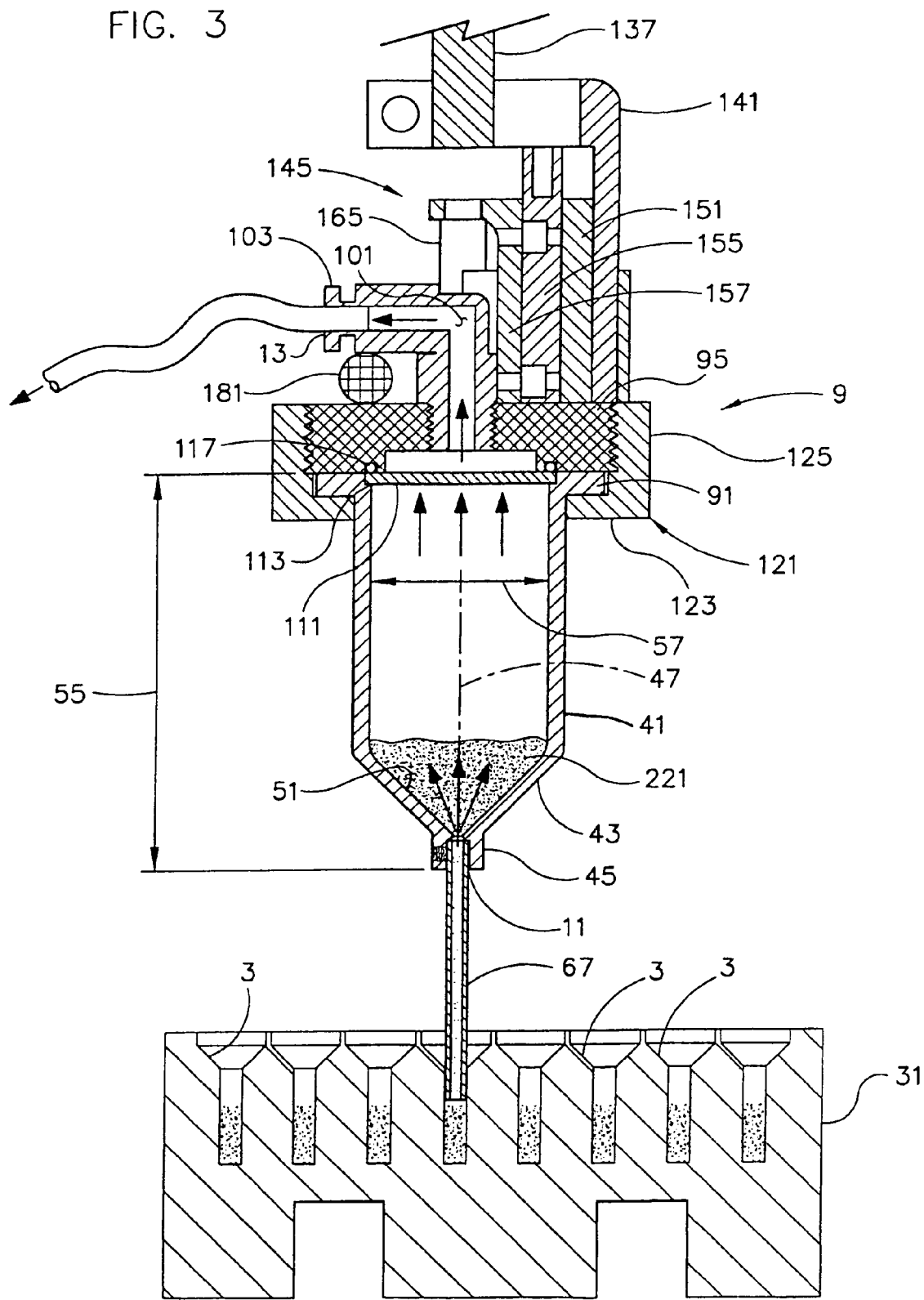
FIG. 3 is a sectional view showing a hopper assembly.

FIG. 3 shows one embodiment of the hopper 9. In this embodiment, the hopper has a cylindric upper section 41 and a funnel-shaped lower section 43 which terminates in a generally cylindric extension 45 on the central vertical axis 47 of the hopper. The lower section 43 has an interior surface 51 which slopes down to the transfer port 11, the slope preferably being in the range of about 30 to 85 degrees, more preferably in the range of about 35 to 70 degrees, still more preferably in the range of about 40 to 60 degrees, and most preferably about 45 degrees. The hopper 9 is made of a suitable polymeric material (e.g., polycarbonate), metal, or ceramic and the interior surface of the hopper is preferably smooth to facilitate flow of powder from the hopper. In the case of a polymer material, the interior surface of the hopper may be smoothed by applying an appropriate solvent finish, and in the case of a metal, the surface may be polished. The size of the hopper 9 will vary, depending on need and application. In one embodiment, for example, the hopper has an overall height 55 in the range of about 0.25 in to 24.0 in., more preferably about 0.4 in to 12.0 in., even more preferably about 0.8 in. to 6.0 in, and still more preferably about 1.0 to 3.0 in; an inside diameter 57 in the range of about 0.25 in to 12.0 in., more preferably about 0.2 in to 6.0 in., even more preferably about 0.4 in. to 3.0 in, and still more preferably about 0.8 to 1.5 in; and a total volumetric capacity (as defined by the sloped and cylindric interior surface of the hopper) in the range of about 1 ml to 40 l, more preferably about 10 ml to 2.0 l, even more preferably about 25 to 500 ml , and still more preferably about 50 ml. These ranges can vary.

Figure 4:
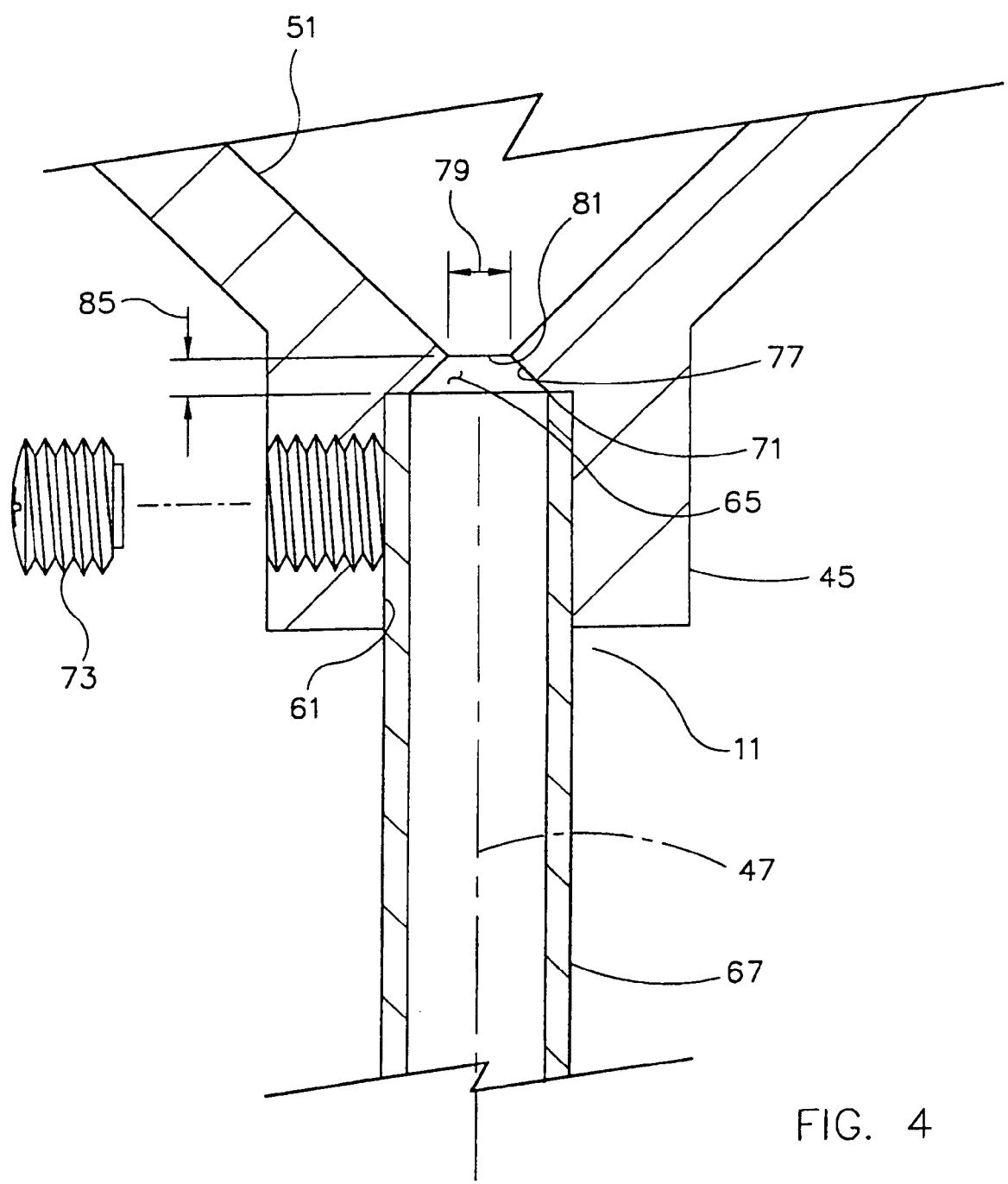
FIG. 4 is an enlarged sectional view showing the orifice of a transport port of the hopper assembly.

Referring to FIG. 4, the transfer port 11 at the lower end of the hopper 9 comprises a passage 61 through the vertical extension 45 having an upper end configured as an orifice 65. The transfer port 11 also includes a conduit in the form of a transfer tube 67 extending down from the passage 61. In the embodiment shown in FIG. 4, the upper end of the tube 67 preferably abuts an internal annular shoulder 71 in the passage 61 directly below the orifice 65 and is held in place by suitable means, such as by a set screw 73 and/or friction (press) fit inside the passage 61. Preferably, the inside diameter of the transfer tube 67 is substantially equal to or greater than the maximum diameter of the orifice 65 at the shoulders 71 so that the orifice provides the greatest restriction to air flow through the transfer port 11 and so that no powder accumulates on the lip of the transfer tube.

In the preferred embodiment (FIG. 4), the orifice 65 has a generally conical wall 77 tapering upwardly from the internal shoulder 71 in the passage 61 to a minimum diameter 79 at a planar knife edge 81 which defines the intersection of the tapered orifice wall 77 and the sloped interior surface 51 of the hopper 9. This edge 81 is preferably circular, although other shapes are possible, and defines, in effect, a two-dimensional "gate" through which gas and powder particles flow to and from the hopper 9. In general, if gas flowing up through this gate 81 has a velocity greater than the free-fall terminal velocity of a powder particle, the particle will be aspirated into the hopper and, once in, will stay in the hopper. If the gas velocity falls below the terminal velocity of the particle, the particle will fall through the gate 81 and out of the hopper 9. It is preferable that the "gate" of the orifice 65 has a short axial dimension (i.e., be substantially planar) to provide a clear boundary determining the direction of particle movement in the direction of the gas flow.

The axial location of the orifice 65 in the passage can vary. The shape and dimensions of the orifice may also vary, so long as it has the functional characteristics described above. In general, the orifice has a diameter at the "gate" in the range of 0.1 mm to 10 mm, more preferably in the range of 0.5 mm to 6 mm, more preferably in the range of 0.75 mm to 4 mm, and even more preferably in the range of 1.0 mm to 3.0 mm. The optimal size for any given application will depend on various factors, including the particle size distribution of powders being handled. More specifically, the ratio of the orifice diameter 79 to particle size is preferably in the range of about 100:1 to 5:1, more preferably in the range of about 50:1 to 5:1, and even more preferably in the range of about 30:1 to 10:1. By way of example only, for SiC particles having a size of 150 microns, the orifice may have a gate diameter 79 of about 1.5 mm, an axial length 85 of about 1.0 mm to 2.0 mm, and the included angle of the conical wall may be about 90 degrees.

The transfer tube 67 is of a chemically inert material, and in one embodiment is fabricated from conventional thin-wall hypodermic metal tubing, e.g., size #12 tubing having an inside diameter of about 3.0 mm to 4.0 mm and an inside diameter approximately equal to or less than the diameter of the orifice 65 at the shoulder 71. The outside diameter of transfer tube 67 should be such as to avoid any contact with the walls of the source wells 3 and destination wells 5. By way of example, the outside diameter of the transfer tube 67 may be 3 mm if the source wells 3 have an inside diameter of 6 mm and the destination wells 5 have an inside diameter of 4 mm. The length of the transfer tube 67 will depend on the depth of the source wells 3 and destination wells 5. By way of example, the tube may have a length in the range of about 0.5 to 6.0 in or more, more preferably in the range of about 1.0 to 3.0 in., and most preferably in the range of about 1.0 in. to 2.0 in.

The upper section 41 of the hopper 9 is formed with a radial flange 91 (FIG. 3), which supports a cover or lid 95 for the hopper. The suction port 13 comprises, in one embodiment a flow passage 101 in a fitting 103 having one end threaded in an opening in the cover 95 and its opposite end connected to a suction line 107. Preferably, the fitting 103 is a quick-connect, quick-disconnect fitting for quick attachment and detachment of the suction line 107 to the fitting. A filter 111 received in an annular recess 113 between the upper end of the hopper 9 and the cover 95 blocks entry of powder into the suction line 107. The filter also preferably functions to flatten the velocity profile of the gas flowing through the hopper, so that the velocity at the center of the hopper is not substantially greater than the velocity adjacent the side wall of the hopper. An O-ring 117 seals the interfit between the hopper 9, cover 95 and filter 111. The cover 95 is secured to the hopper by an annular retaining cap 121 having a lower flange 123 underlying the radial flange 91 on the hopper, and a side wall 125 which threadably engages the cover 95. To tighten the assembly, the retaining cap 121 is positioned as shown in FIG. 3, and the cover 95 is threaded down into the cap tight against the radial flange 91 of the hopper 9 to squeeze the O-ring 117 and seal the joint with the filter 111 in place.

In the particular embodiment of FIG. 3, the hopper 9 has only one transfer port 11 and one suction port 13. However, it will be understood that more than one transfer port may be provided. Similarly, more than one suction port may be provided, each connected to a separate vacuum source or to a common source.

Figure 5:
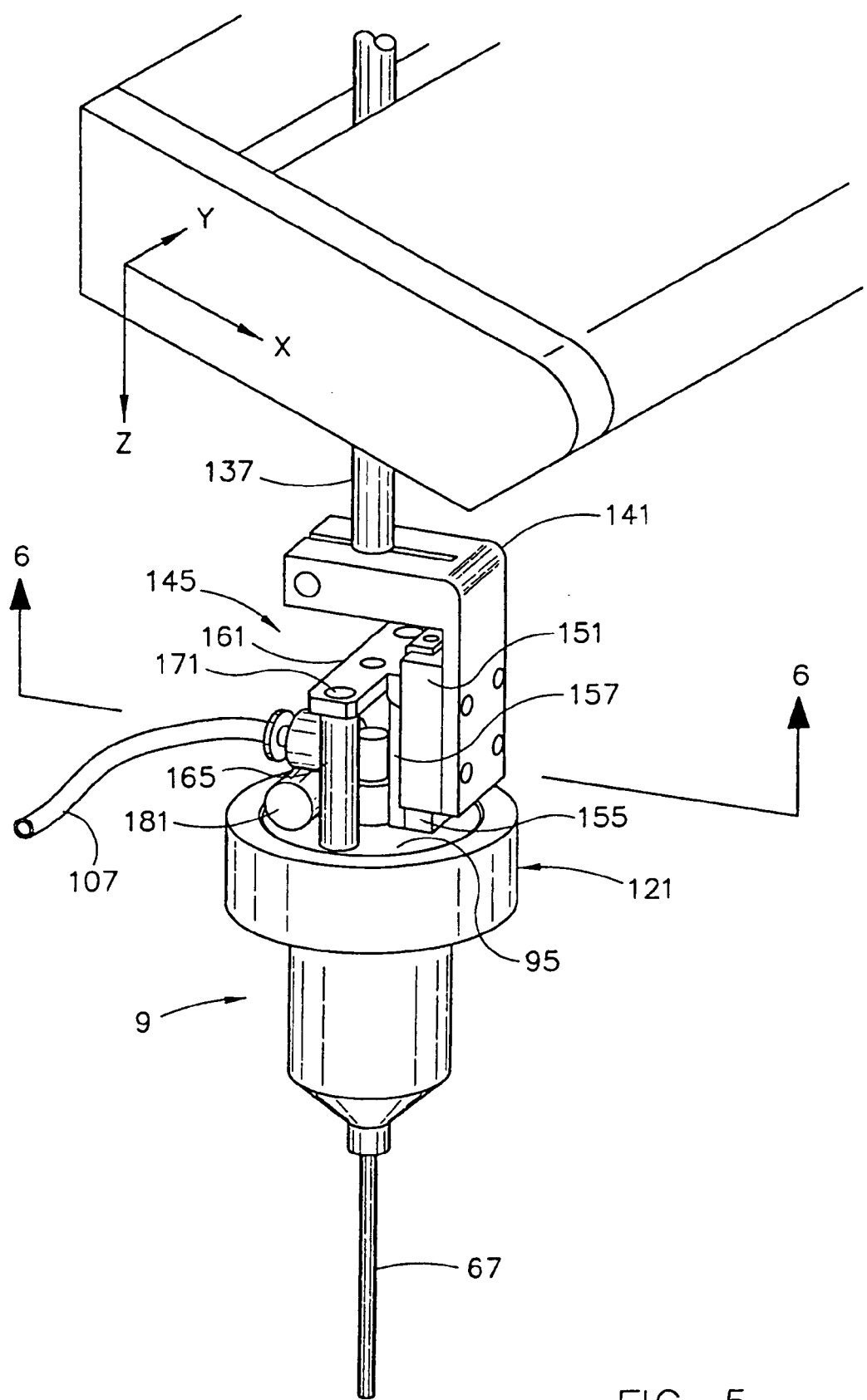
FIG. 5 is a perspective of the hopper assembly as carried by a robot, only a portion of which is shown.

The transport device 21 comprises a robot (e.g., a Cavro® robot) having an arm 131 mounted on a rail 133 for movement along a horizontal X-axis, and a vertical rod 137 mounted on the arm for horizontal movement with respect to the arm along a Y-axis and for vertical movement with respect to the arm 131 along a Z axis corresponding to the longitudinal axis of the rod (FIGS. 1 and 3). In the embodiment of FIG. 3, the Z-axis corresponds to the central vertical axis 47 of the hopper 9, but these two axes could be offset. The hopper 9 is mounted on the lower end of the rod 137 by means of a support which, in one embodiment (FIG. 5), comprises an angle bracket 141 and a shock-absorbing suspension system, generally indicated at 145,which allows the hopper 9 to move up and down independent of the bracket 141 through a limited range of movement to provide some shock absorption in the event there is an impact involving the hopper 9 and/or transfer tube 67.

Figure 6:
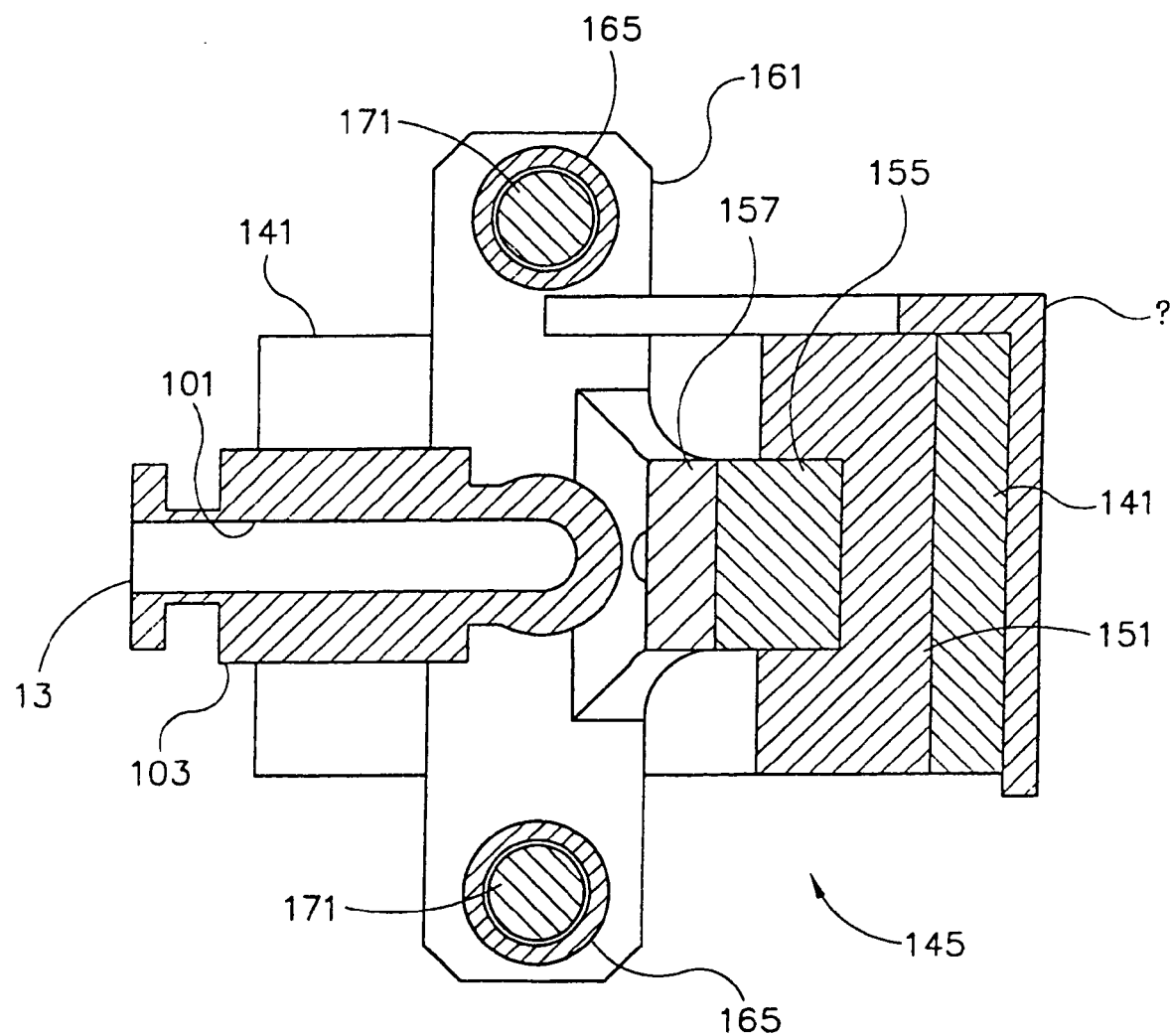
FIG. 6 is a horizontal section on line 6—6 of FIG. 5.

In one embodiment (FIGS. 3, 5 and 6), the suspension system 145 comprises a track 151 affixed to the bracket 141, a linear slider 155 slidable up and down in the track 151, and a frame 157 on the hopper attached to the slider. The frame 157 is secured to the cover 95 of the hopper and has an upper cross bar 161 spaced above the cover. A pair of standoffs 165 extend between the cover 95 and opposite ends of the cross bar 161 to reinforce and stabilize the assembly. The standoffs 165 are fastened to the cross bar 161 and to the cover 95 by suitable fasteners 171. The arrangement is such that in the event an upward force is applied to the hopper 9 and/or transfer tube 67, the hopper will move upward a limited distance to dissipate any shock to the system. Upon removal of the upward force, the hopper returns to the lower limit of its travel under the influence of gravity. Suitable shock absorbing elements (not shown) may be provided at the upper and lower limits of movement. The hopper may be mounted on the robot 21 in other ways. Alternatively, the hopper may be mounted in fixed position, and the source wells 3 and destination wells 5 may move relative to the hopper, as by mean of one or more conveyors (e.g., turntables) or the like.

In the preferred embodiment, a vibrator device 181 vibrates the hopper 9 to inhibit bridging of the powder in the hopper, especially at the transfer port 11, and to otherwise promote the free flow of the powder from the hopper over a wide range of particle sizes. In the embodiment shown in FIG. 5, the vibrator device 181 is mounted on the cover 95 of the hopper and is of conventional design, comprising a vibrator motor and an eccentric mass (not shown) rotated by the motor to produce the desired vibrations. By way of example, the motor can be 1.3 DC vibrating motor having a rated RPM of 7500 at 1.3 VDC, such as is commercially available from Jameco, Part No. 190078. The vibrations generated by the vibrator are at a suitable frequency and amplitude depending on various factors, including the type of powder being handled. For example, for #80 mesh size SiC powder, the vibrator 181 may be operated to produce a gentle sinusoidal vibration. On the other hand, for particles which tend to agglomerate, a larger amplitude of vibration may be necessary to promote the free flow of particles. The frequency of vibration will also vary, with one preferred range being 20 Hz–1000 Hz, and another being 30 Hz–400 Hz. The term "vibration" is used in a broad sense to mean the application of alternating or oscillating forces (e.g., tapping or shaking forces) to the hopper tending to disturb the particles in the hopper to promote free flow.

The robot 21 is programmable in conventional fashion to move the hopper 9 from the one or more sources 3, where an aspiration operation occurs, to the one or more destination receptacles 5, where a dispensing operation occurs, and back again. Other types of conveying devices may be used to transport the hopper. Alternatively, the hopper 9 may remain fixed, and the source and destination vessels 3, 5 may be moved relative to the hopper, as by one or more conveyors, turntables or other mechanisms.

Referring again to FIG. 2, the gas flow control system 17 comprises, in one embodiment, a vacuum pump 201 for generating a flow of air through the suction line 107 attached to the hopper 9 toward the pump. The pump 201 has a vent indicated at 205. The control system also includes a flow controller 209 in the suction line 107 for controlling the rate of flow through the line. In one embodiment, this flow controller comprises a mass flow control device, but it will understood that other flow control devices (e.g., a proportional valve) could be used. A filter 215 and on/off valve 217 are provided in the suction line between the hopper and the flow control.

The flow control system 17 is controlled by the processor 25 to generate an upward flow of air or other gas through the hopper transfer port 11 at different selected velocities greater than 0.0 m/s. These velocities include (1) an aspirating velocity for aspirating powder into the hopper from at least one of the one or more sources to form a fluidized bed 221 of powder in the hopper 9 above the transfer port 11 (see FIG. 3), (2) a transporting velocity sufficient to maintain the powder fluidized and contained in the hopper against the force of gravity during transport of the hopper, and (3) a dispensing velocity less than the aspirating velocity but sufficient to maintain fluidization of the bed while allowing powder from the bed 221 to gravitate through the transfer port 11 for dispensing into at least one of the one or more destination wells 5. The magnitude of these velocities will vary depending on the type of particles being transferred, particle density, hopper geometry, the desired rate of powder aspiration and powder dispensing, and other factors. By way of example, suitable aspiration and transport velocities may be 0.1 m/s to 10.0 m/s (e.g., about 2.8 m/s for #80 mesh size SiC particles), and a suitable dispensing velocity may range from 0.0 m/s to 5.0 m/s. It may be desirable to vary the velocity of gas flow during aspiration and dispensing, as discussed later. In any event, the gas velocity is preferably such that the powder is maintained as a fluidized bed 221 in the hopper and not pulled in bulk up against the filter 111.

Referring again to FIGS. 1 and 2, the system includes a weighing system comprising a first weigher in the form of a scale 231, for example, for weighing the amount of powder aspirated into the hopper 9 from the one or more source wells 3. In one embodiment, the block 31 containing the aforementioned source wells 3 sits on the scale, using any suitable registration mechanism (not shown) for accurately positioning the block (or other holder) on the scale so that the precise position of each source well 3 is known to the automated transport system 21. The scale 231 monitors the decreasing weight of the block 31 as powder is aspirated into the hopper to provide a measurement of the amount of powder so aspirated. The scale 231 can be of any conventional type (e.g., a precision electronic balance capable of communication with the processor 25) having suitable accuracy and capacity (e.g., readable to within 1.0 mg with a capacity of 2 kilograms). Alternatively, the amount of powder aspirated can be measured in other ways, as by monitoring the increasing weight of the hopper 9 as it fills with powder, or by measuring the decreasing height of powder in the source well 3, or by measuring the increasing height of powder in the hopper. Other measuring systems may also be suitable.

The weighing system of this embodiment also includes a second weigher in the form of a scale 235, for example, for weighing the amount of powder dispensed from the hopper 9 into the one or more destination receptacles, e.g., the array of wells 5 in the block 35. In the embodiment of FIG. 1, the block is precisely positioned on the scale by a positioning device, generally designated 241, so that the precise position of each destination well 5 is known to the robot. The scale 235 monitors the increasing weight as powder is dispensed from the hopper 9 to provide a measurement of the amount of powder so dispensed. The scale 235 can be of any conventional type (e.g., a precision electronic balance capable of communication with the processor 25) having suitable accuracy and capacity (e.g., readable to within 0.1 mg with a capacity of 510 grams). In general, the second scale 235 requires greater accuracy than the first scale 231, since small amounts are being dispensed and measured to greater accuracy. The amounts dispensed into the destination wells 5 could be measured in other ways, as by measuring the decreasing height of powder in the hopper 9, or by measuring the increasing height of powder in the wells 5. Other measuring systems may also be suitable.

FIGS. 7A–7D illustrate the device 241 for positioning the block 35 on the second weigher 235 as comprising, in one embodiment, a track 247 secured by means of a bracket 251 to a housing 255 of the second weigher 235, a vertical slider 261 slidable up and down in the track 247, and a fork 265 comprising a base 267 attached to the slider 261 and a pair of tines or arms 269 extending forward from the base 267 through openings 275 in the block 35. The arms 269 are configured (e.g., notched) to define a pocket 281 which is dimensioned to snugly receive the block 35 in a front-to-back direction. Also, the arms 269 of the fork 265 are dimensioned to have a close fit in respective openings 275 in a side-to-side direction. For example, the openings 275 may be in the form of vertical slots in the block 35, and each slot may have a width in side-to-side horizontal direction only slightly greater than the width of an arm 269 of the fork 265. As a result, when the block 35 is properly seated in the pocket 281 defined by the arms 269, the block 35 and wells 5 therein are positioned for being precisely located on the scale 235. The openings 275 in the block 35 also serve to reduce the weight of the block so that it may be more accurately weighed by the scale 235.

Figure 7A:
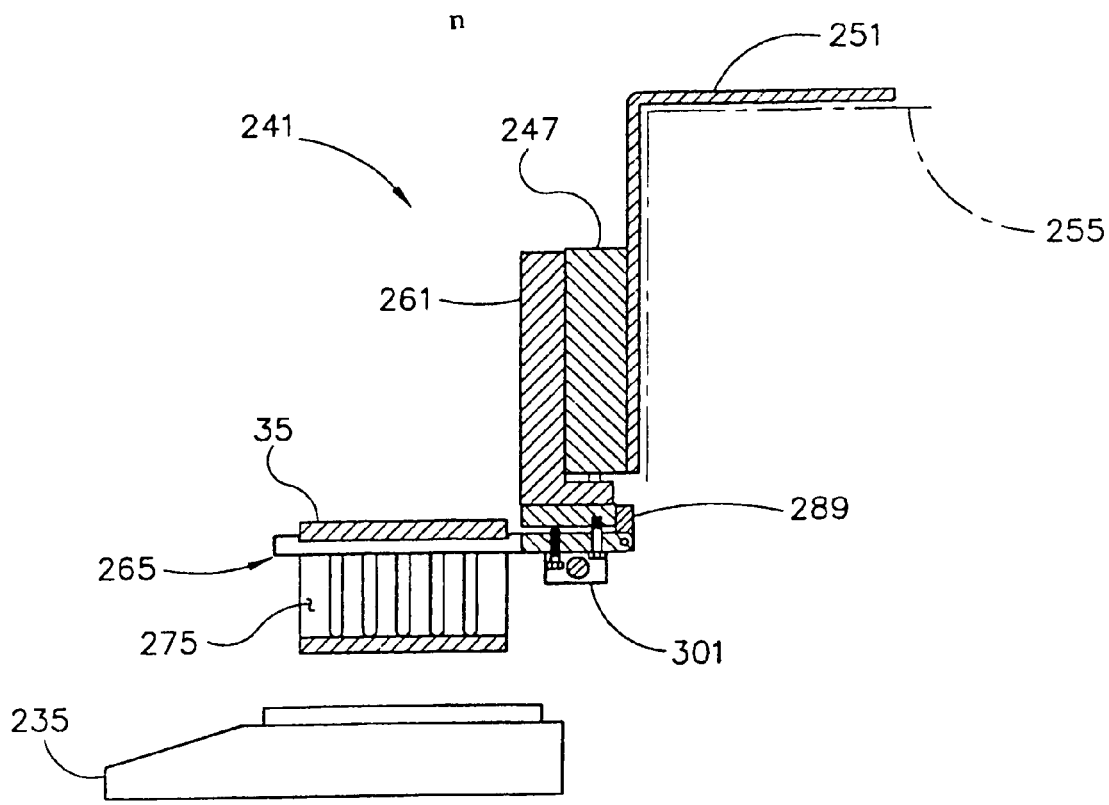
FIGS. 7A–7D are side elevations of a device for precisely positioning an array of destination receptacles on a scale.
Figure 7B:
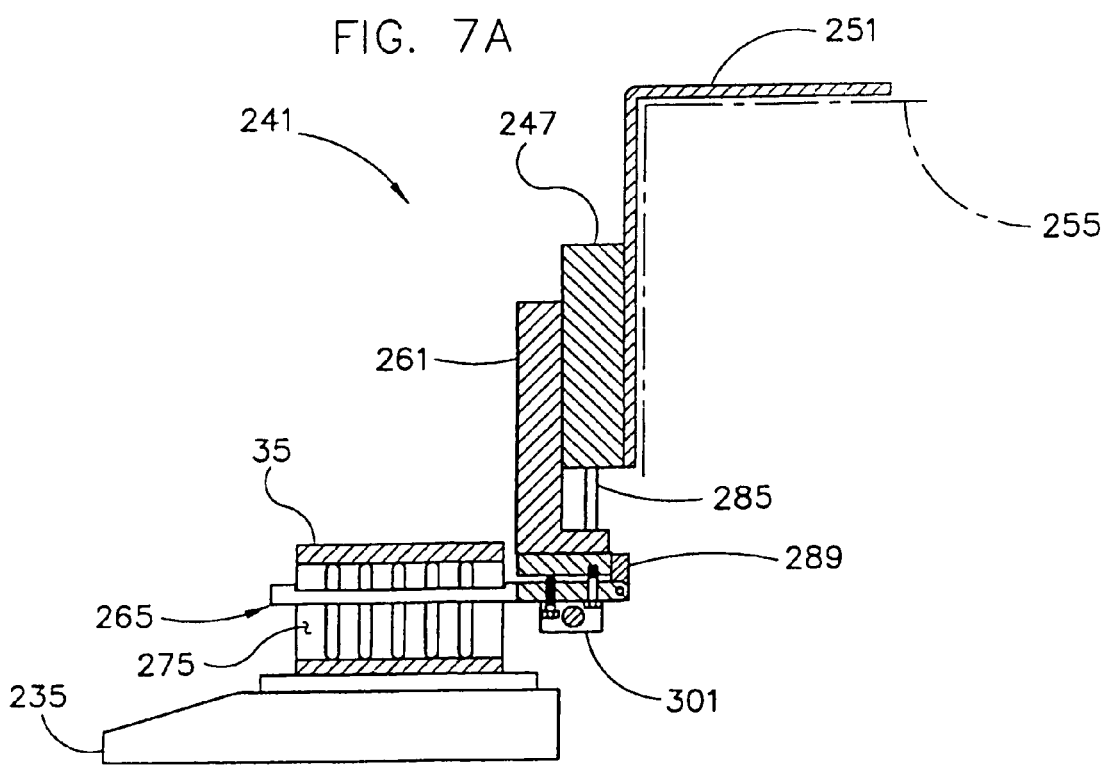
Figure 7C:
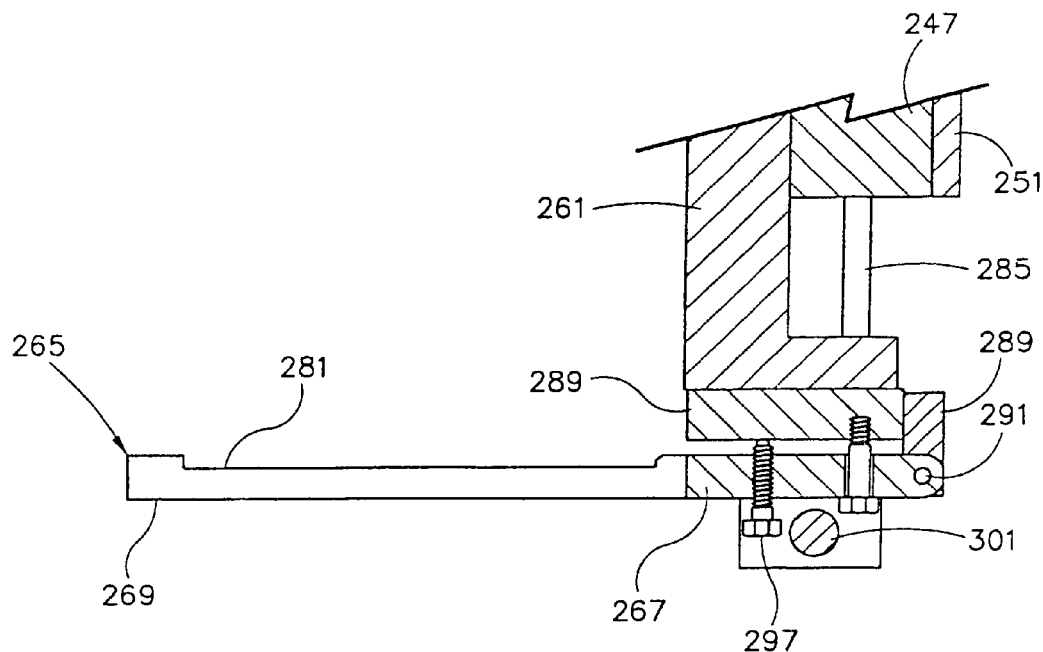
Figure 7D:
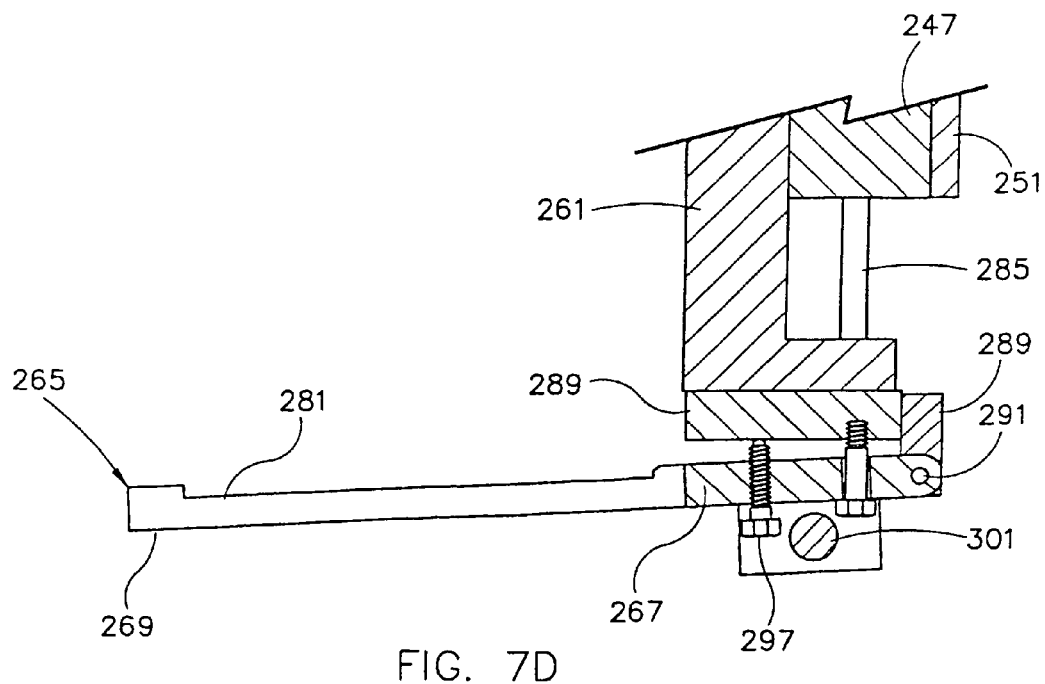

The slider 261 is movable in its track 247 by a suitable power actuator 285 (e.g., a pneumatically extensible and retractable rod) so that the slider and fork 265 can be raised and lowered relative to the scale 235. When the fork 265 is raised and supporting the block 35 (FIG. 7A), the arms 269 of the fork contact the upper ends of respective openings 275 in the block 35 and support the block at a location spaced above the scale. As the slider and fork move down, the block 35 is placed on the scale 235 and the arms move down in the openings 275 to release the block so that its full weight is on the scale (FIG. 7B). The base 267 of the fork is pivoted on a bracket 289 secured to the slider 261 for swinging up and down about a generally horizontal axis 291 (FIGS. 7C and 7D). The angle of the fork 265 relative to ground can be varied by using a pair of adjustment screws 295, 297, one of which (295) extends through a clearance hole in the fork base 267 and threads into the bracket 289, and the other of which (297) threads through the base and pushes against the bracket (FIGS. 7C and 7D). Other positioning devices can be used.

In the preferred embodiment, a packing device (FIGS. 7A and 7B) in the form of a vibrator 301 is mounted on the positioning device 241 and is operable to vibrate the fork 265 and the block 35 on the fork. Such vibration is useful to settle or pack the powder in the wells 5 prior to any dispensing of additional material into the wells, as will be explained.

The processor of FIGS. 1 and 2 is programmed to operate the flow control system 17 to vary the upward flow of air (or other gas) through the transfer port 11 of the hopper 9 as a function of one or more variables. These variables will typically include at least one of the following: (1) information relating to an amount of powder aspirated into the hopper from one or more source wells 3; (2) information relating to a rate at which powder is aspirated into the hopper from the one or more source wells 3; (3) information relating to an amount of powder dispensed from the hopper into one or more destination receptacles 5; and (4) information relating to a rate at which powder is dispensed from the hopper into the one or more destination receptacles 5. In one embodiment, the variable (1) information is provided by the first weigher 231 (or other system used for detecting the amount of powder aspirated); the variable (2) information is derived by the processor 25 based on information received from the first weigher 231 (or other system used for detecting the amount of powder aspirated); the variable (3) information is provided by the second weigher 235 (or other system used for detecting the amount of powder dispensed); and the variable (4) information is derived by the processor 25 based on information received from the second weigher 235 (or other system used for detecting the amount of powder dispensed). In other embodiments, the variable (1)–(4) information can be provided in other ways and by alterative mechanisms. Further, the number of variables may differ from system to system.

Figure 8:
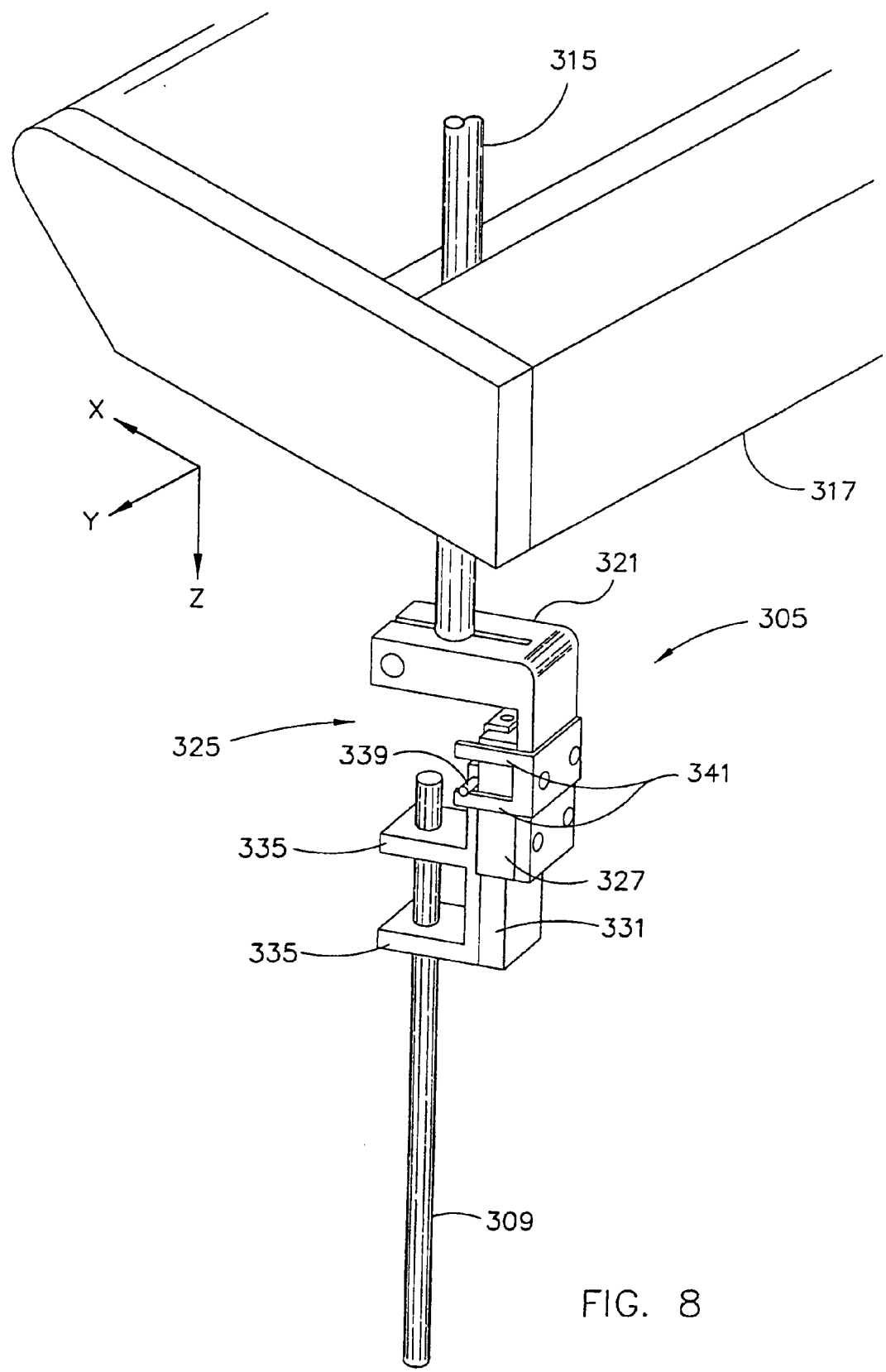
FIG. 8 is a perspective of a device for measuring the height of a powder bed in a destination receptacle.

It may be desirable in certain work flow processes, discussed later, to know the volume of material dispensed into one or more of the destination wells 5. A bed height measuring device, generally designated 305 in FIG. 8, is provided for this purpose. In one embodiment, the measuring device comprises an elongate probe 309 supported by a bracket 321 attached to a vertical Z axis rod 315 mounted on a second arm 317 of the robot 21, so that the probe is movable by the robot along X, Y and Z axes. (In general, the robot 21 functions as a positioning mechanism for effecting relative movement between the probe 309 and the destination receptacles 5.) The probe 309 is supported on the bracket 321 by means of a suspension system 325 which, in one embodiment, is similar to the one for mounting the hopper on the robot. The suspension system 325 comprises a track 327 affixed to the bracket 321, a slider 331 slidable up and down in the track, and a pair of arms 335 extending out from the slider one above the other for holding the probe 309 in position. The probe 309 is preferably slidably adjustable up and down relative to the arms 335 and secured in adjusted position by setscrews or other suitable mechanism (not shown). The vertical range of travel of the slider 331 in the track 327 is limited by a stop arrangement of suitable design, such as a stop element 339 on the slider 331 engageable with upper and lower stops 341 on the bracket 321. The probe 309 remains in its lowered position (set by the contact of the stop element 339 with the lower stop 341) unless an upward force is applied to the probe in which case the probe is free to move upward to a limited extent (set by the contact of the stop element 339 with the upper stop 341), as permitted by the slider 331 sliding up in the track 327. To measure the height of the bed of powder in a particular destination receptacle 5, the robot 21 lowers the probe 309 into a well 5 until the lower end of the probe contacts the bed 345 of powder in the well (see FIG. 12). This contact is sensed by the second weigher 235, and a contact signal is generated to record the vertical position of the Z-axis rod 315 of the robot 21 at the time of such contact. From this information the vertical position of the lower end of the probe 309 in the vessel 5, and thus the height of the powder bed 345, can readily be determined. The probe 309 has an outside diameter significantly less than the inside diameter of a destination well 5 (e.g., 3 mm v. 4 mm) to avoid any contact with the walls of the well as the probe is lowered into the well, and the lower end of the probe is preferably substantially flat with a surface area sufficient to inhibit downward movement through the powder upon contact. The probe 309 is also preferably relatively lightweight (e.g., 5–20 gm) but sufficiently heavy as to be readily detectable by the second weigher 235. Upon contact, the weight should be sensed essentially immediately and further downward movement of the Z-axis rod 315 stopped. In the event there is some slight further movement downward, the probe 309, supported by the powder, will simply move up relative to the robot, as permitted by the slider 331 sliding up in its track 327, so that the only weight sensed by the weigher 235 is the weight of the probe 309. As a result, the height of the bed 345 can be measured with accuracy.

In the embodiment described above, the probe 309 is moved by the robot 21 relative to stationary destination receptacles 5. However, it will be understood that the receptacles 5 could be moved relative to the probe 309 as by a suitable lifting mechanism. In this case, the vertical position of the receptacles instead of the probe would be recorded at the time of contact between the powder bed and the lower end of the probe. A linear stage or other measuring device could be used to record the vertical position of the receptacles.

Figure 9:
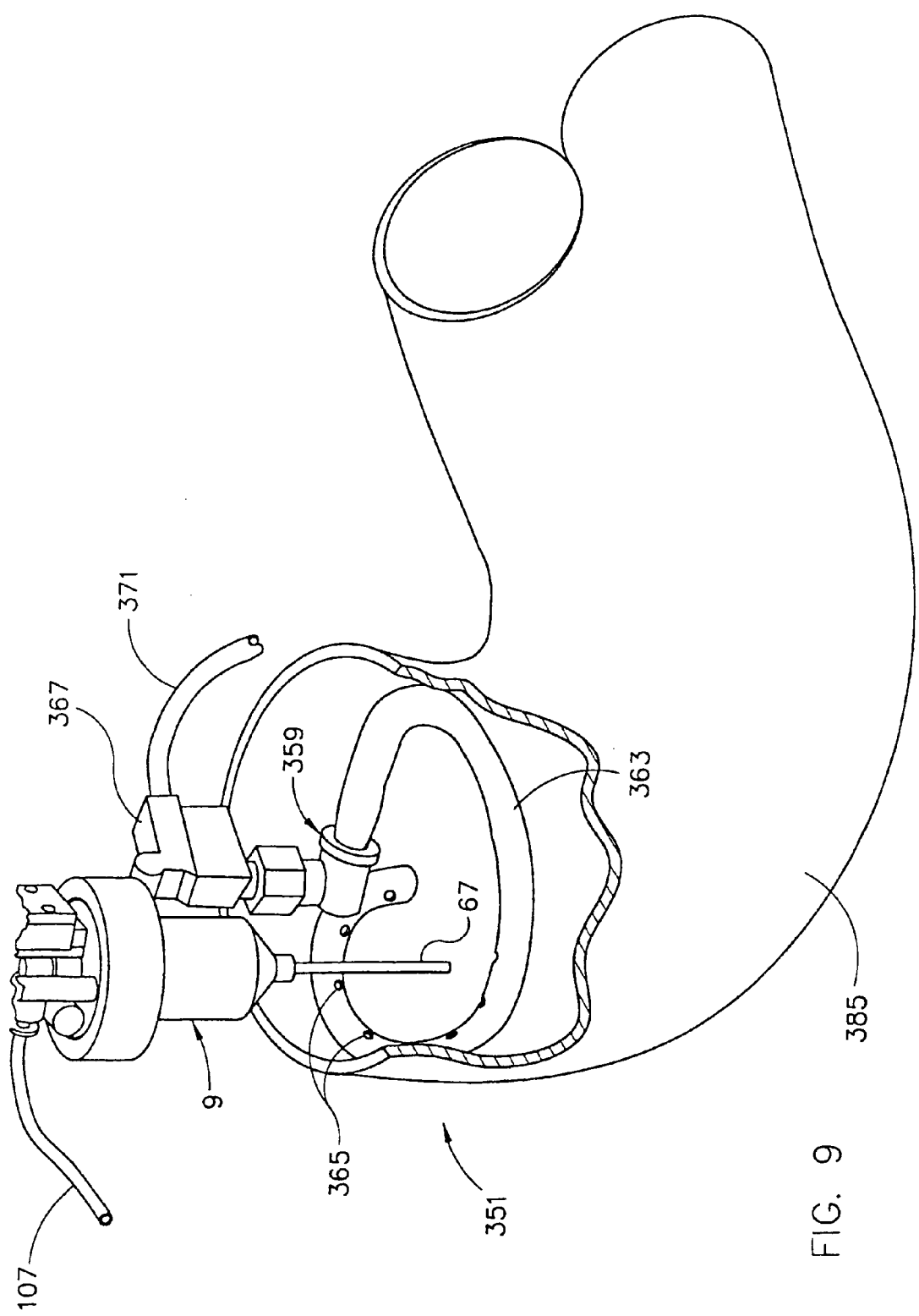
FIG. 9 is a perspective of one embodiment of a cleaning system of the apparatus of FIG. 1.

A cleaning system, generally designated 351, is provided at a cleaning station 355 (FIG. 2) for cleaning the various components of the transfer system. In one embodiment (FIG. 9), the cleaning system 351 comprises a pneumatic blower 359 for blowing powder off the external surfaces of the transfer tube 67, hopper 9 and associated parts. The blower 359 comprises, by way of example, a ring 363 formed from suitable tubing (e.g., 0.25 in. tubing), air holes 365 spaced at intervals around the ring for directing jets of gas such as air radially inward (e.g., 0.030 in. air holes spaced at 1.0 cm intervals), and a gas inlet 367 which is connected by an air line 371 to a suitable source of high-pressure gas (e.g., 40–100 psi air). The ring 363 of the blower 359 is sized so that the transfer tube 67 and hopper 9 can be lowered into the ring and subjected to jets of gas to remove powder from exterior surfaces of the hopper and transfer tube. At the same time, the on/off valve 217 in the suction line 107 can be closed and an on/off valve 375 (FIG. 2) in a cleaning line 377 can be opened to introduce a pressurized cleaning fluid 381 into the hopper 9 and down through the transfer tube 67 to clean the internal surfaces of the hopper and tube. The on/off valves 217, 375 are preferably both under the control of the processor 25 to provide a totally automated cleaning process. The cleaning fluid 381 used may be clean dry gas (e.g., air). For pharmaceutical applications or applications where the powder particles are soluble in a liquid, a suitable liquid can be used, such as water or a high volatility solvent (e.g., Methanol, Acetone, or the like), followed by a drying gas flow. If not already activated, the vibrator 181 on the hopper 9 is preferably used during the cleaning operation to loosen any particles stuck on the walls of the hopper and transfer tube.

In one embodiment, the cleaning operation takes place at the cleaning station 355 inside a flexible duct 385 or other enclosed space connected by a vacuum line 391 to a source of vacuum (not shown), so that powder removed from the transfer tube 67 and hopper 9 is disposed to waste. Flow through the vacuum line 391 is controlled by an on/off valve 395 under the control of the processor 25, and the line 391 is provided with a filter 397 and vent 399, as shown in FIG. 2. Other cleaning arrangements may be used.

The components of the system described above are preferably enclosed inside an enclosure 405 (FIG. 1) to avoid undesirable air currents which might adversely affect the accuracy of the weighers 231, 235 and/or disturb the powders used during the transfer process. The enclosure 405 includes a series of transparent panels, at least one of which is movable to form a door 409 providing access to the components inside. In the particular embodiment shown in FIG. 1, the door comprises a front panel movable between a closed position and an open position. The enclosure may have any suitable configuration.

The operation of the system described above can be illustrated by an exemplary process in which the source wells 3 contain catalysis candidates to be screened. To initiate the process, the vibrator 181 on the hopper 9 is activated; the robot 21 is operated to move the hopper 9 into position over a selected source well 3; and the gas flow control system 17 is activated to establish an upward flow of gas through the transfer port 11 at a suitable aspirating velocity. As noted previously, the aspirating velocity may vary, depending on the type, size, density and other characteristics of the powder being aspirated, and on the desired rate of aspiration, the rate of aspiration being proportional (e.g., directly proportional) to the magnitude of the velocity.

With the hopper 9 appropriately positioned over a source well 3, the robot 21 lowers the hopper 9 into the well to aspirate a selected quantity of material into the hopper, as measured by the decrease in weight registered by the weigher 231. During aspiration, powder moves up through the transfer tube 67 and orifice 65 into the hopper, where it is maintained as a fluidized bed 221 above the transfer port 11 by the upwardly moving gas (see FIG. 3). In this fluidized condition, the powder is readily flowable so that powder continues to move freely up into the hopper even as the hopper fills and the overall height of the bed 221 increases. During the aspirating process, the velocity of the gas may be maintained constant, or it may be varied, depending on the desired rate of aspiration. As aspiration continues and the level of powder in the source well 3 goes down, the robot preferably continues to move the transfer tube 67 downward and, optionally, laterally so that the tip of the transfer tube traces a path relative to the powder bed (e.g., a Figure-8 path). The downward movement of the transfer tube 67 can be intermittent or continuous. The hopper 9 is preferably filled to no more than about 50% of its total volumetric capacity to ensure uniform fluidization of the powder bed 221 in the hopper.

After a desired amount of powder, e.g., 10 mg to 20 grams is aspirated into the hopper 9, the robot 21 raises the hopper for transport to the destination receptacle(s) 5. During transport, upward gas flow through the transfer port 11 is continued at a velocity sufficient to maintain the powder in the hopper and in a fluidized condition. The transporting velocity is preferably about the same velocity as the aspirating velocity, but it may be less, so long as it is sufficient to prevent substantial powder from leaking out through the "gate" 81 of the orifice 65 in the transfer port 11. Preferably, the vibrator 181 continues to operate during transport to assist in maintaining the bed of powder in a fluidized state.

Upon arrival at a location above the appropriate destination receptacle (e.g., a particular well 5 in the block 35), the hopper 9 is moved down to lower the transfer tube 67 inside the receptacle and the velocity of the gas through the transfer port 11 is reduced to a level sufficient to permit dispensing of the powder into the receptacle 5. The rate at which the powder is dispensed may be constant or it may be varied by varying the rate (velocity) of gas flow through the transfer port 11. The amount of dispense will vary, but typically will be in the range of 0.1 mg to 500 mg or more.

Figure 10:
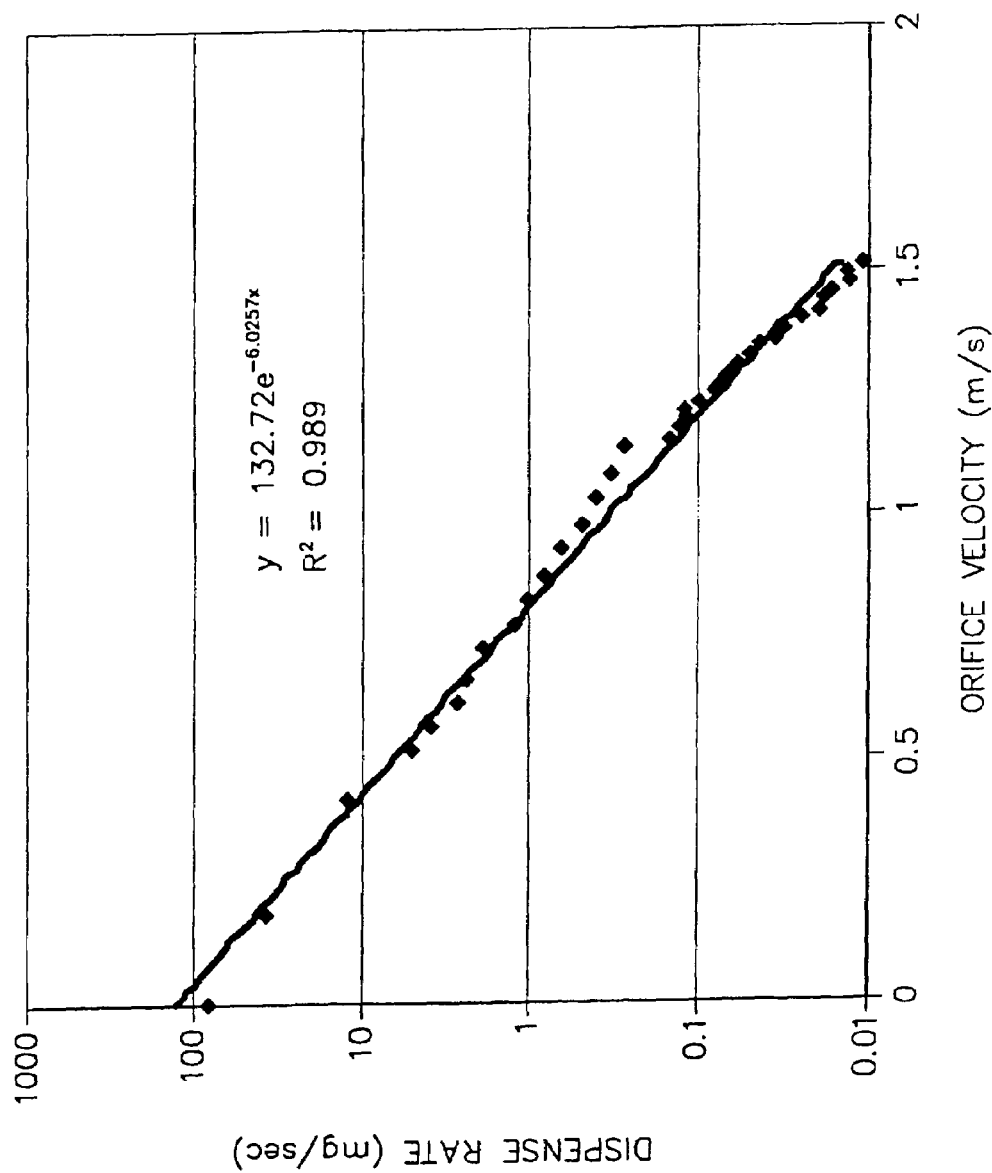
FIG. 10 is a graph showing a relationship between gas velocity through the orifice and the rate at which powder is dispensed through the orifice.

FIG. 10 is a graph showing the relationship between gas (e.g., air) velocity through a transfer port 11 having an orifice gate diameter 79 of 1.5 mm and the rate at which powder is dispensed through the transfer port. As shown, the relationship is an inverse, generally exponential relationship, with the dispensing rate decreasing generally exponentially as the velocity increases from a maximum dispensing rate of about 100 mg/sec at a nominal velocity of 0.0 m/sec. to a negligible dispensing rate of 0.01 mg/sec at a velocity of 1.5 m/s. It has been observed that the relationship between the gas flow rate and the particle dispense rate may be represented by the following equation:

$$R = A(F)^{-b} \quad \text{(Equation 1)}$$

where R is the particle dispense rate, F is the mass or volumetric flow rate of the working fluid (e.g., gas), and A and b are positive constants which reflect the hydrodynamic properties of the particles being dispensed. These constants can be determined empirically by running an appropriate powder training program. Such a program may involve setting the flow rate through the orifice at a first value and measuring the dispensing rate at that value; setting the orifice gas flow rate at a second value and measuring the dispensing rate at that value; and repeating the process to obtain sufficient data points to generate a graph from which constants A and b can be derived.

Figure 11:
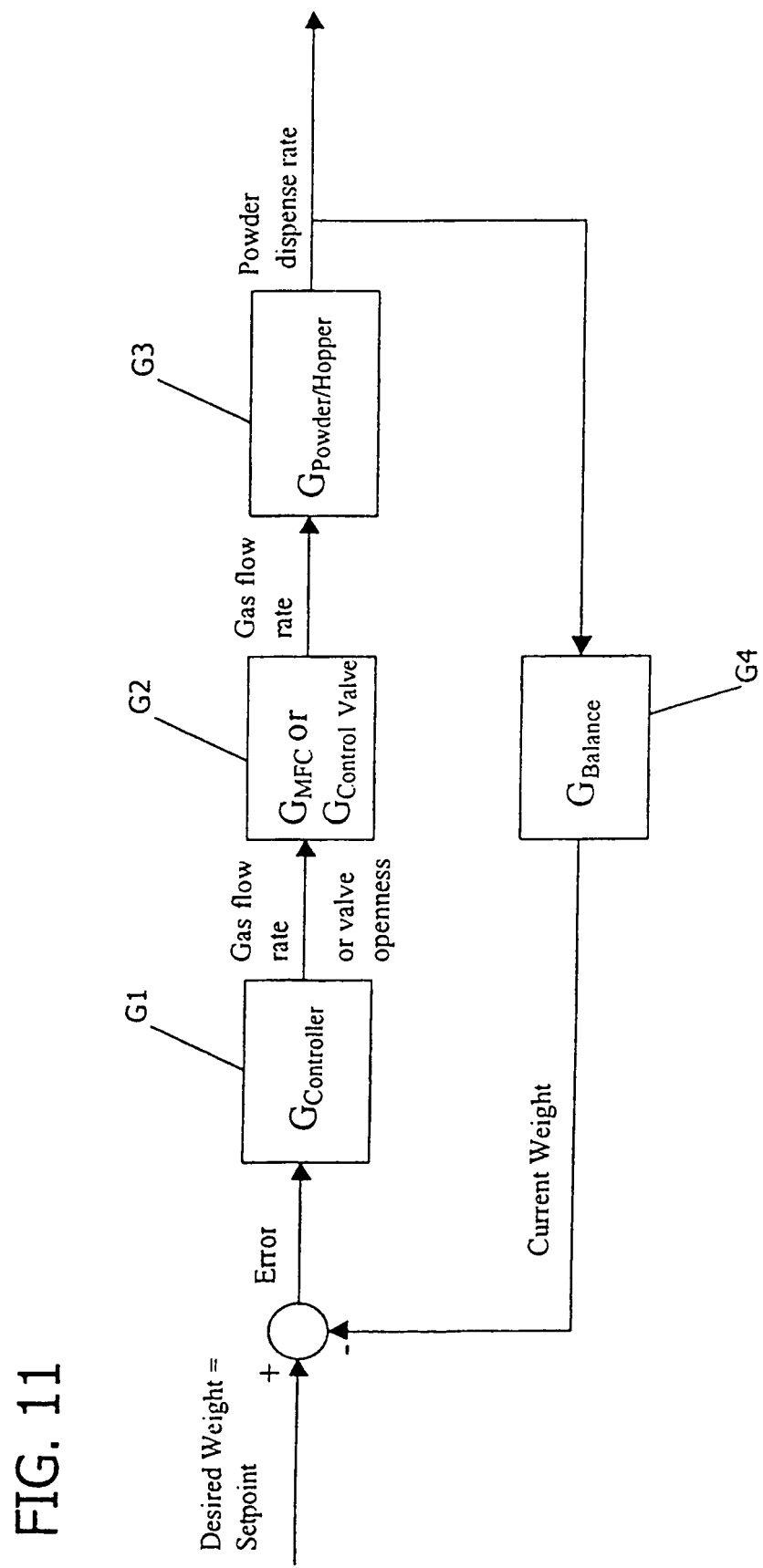
FIG. 11 is a process control diagram illustrating how a dispensing process is controlled.

Equation 1 can be used to develop a dispense algorithm which can then be used by the processor 25 to control the rate at which powder is dispensed, as shown by the process control diagram in FIG. 11 where the various steps in the process are represented by a number of transfer functions G1–G4. For example, assume that the goal of the dispense algorithm is to deliver as quickly as possible the desired quantity of powder to the destination well 5 within a specified error. After A and b are determined, the system can be fully characterized and a conventional PID loop 421 or other linear control algorithm with cut-off can be employed to translate weight readings from the second weigher 235 into dispense rates. Using this algorithm, the processor can be programmed to dispense at a faster rate early in the dispense cycle and at a slower rate diminishing to zero later in the cycle as the target dispense weight is approached to prevent significant overshoot.

In some situations, it may not be possible to accurately determine constants A and b before the dispensing process begins. In such situations, the constants can be developed on the fly during the dispensing process by using an adaptive control algorithm for $G_{controller}$ at G1 in FIG. 11. In this situation, constants A and b are initially assigned certain values, based on historical data for example, and these values are modified during the course of the dispensing process depending on the actual flow rates (velocities) and dispensing rates as measured during the process.

Figure 11A:
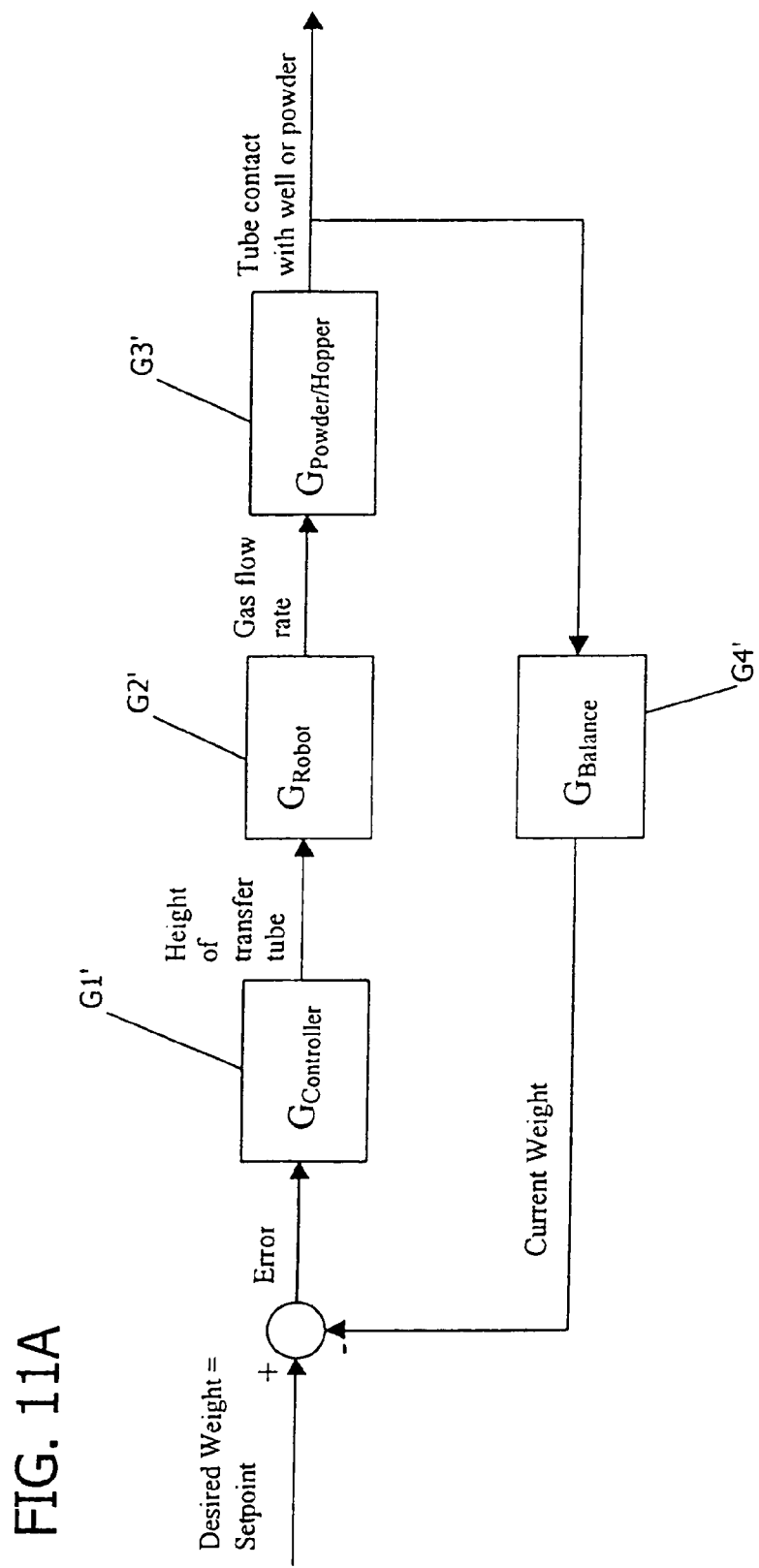
FIG. 11A is a process control diagram illustrating how an aspiration process is controlled.

As shown in FIG. 11A, the same basic process described above is followed for an aspiration operation, except that the process involves different transfer functions G1', G2' and G3'. Further, the weigher involved at function G4' may be either the first weigher 231 or the second weigher 235, since aspiration may occur at either station.

After the desired amount of material has been dispensed into the well 5, as sensed by the second weigher 235, the hopper 9 is moved up and over to the source well 3 where it unloads any excess material back into the source well 3. Then the hopper 9 is moved to the cleaning station 355 for cleaning by the blower 359. The blower blows material off the outside and inside of the hopper 9. The hopper 9 may also aspirate and hold an abrasive material (e.g., 500 mg of silicon carbide) in the hopper 9 in a fluidized state for a period (e.g., twnety seconds) to remove any residue from the inside of the hopper. Then the abrasive material is dispensed to a waste receptacle (not shown). The cycle is then repeated until material from each of the desired source wells 3 is transferred to a respective destination well 5, following which the block 35 is lifted from the second weigher 235 and moved to the next stage of the screening process.

Figure 14:
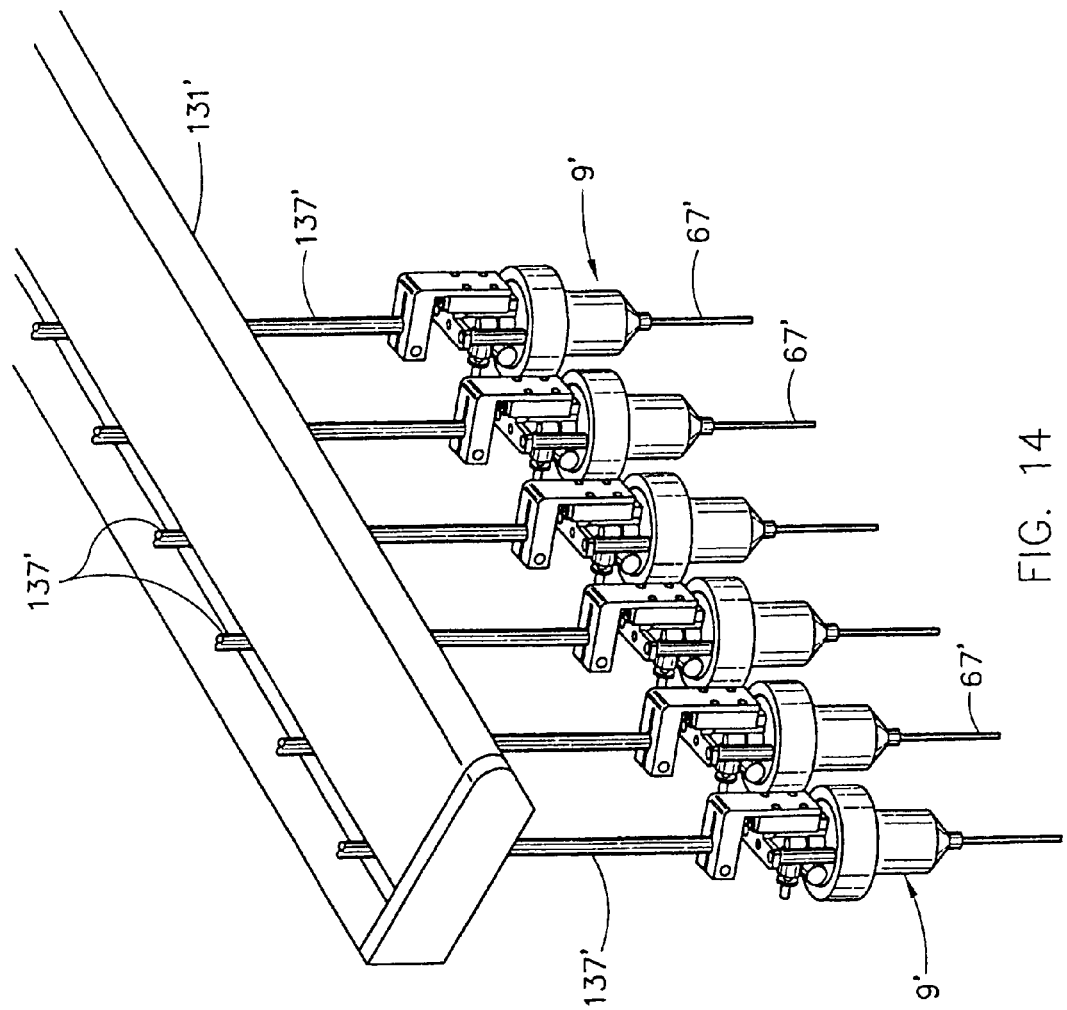
FIG. 14 is a perspective view of an array of hoppers supported by a robot for simultaneously transferring multiple quantities of powder from an array of sources to an array of destination receptacles.

FIG. 14 is a view illustrating another embodiment of the invention capable of simultaneously transferring multiple quantities of the same or different powders from an array of source vessels to an array of destination receptacles. In this embodiment, two or more hoppers, each generally designated 9', are mounted on respective vertical Z-axis rods 137' on an arm 131' of a robot in a linear array formation corresponding to a linear array formation of source vessels and destination receptacles. That is, the centerline spacing of the transfer tubes 67' of the hoppers 9' relative to one another corresponds to the centerline spacing of the source vessels relative to one another and the centerline spacing of the destination receptacles relative to one another. Each hopper 9' of the array is essentially of the same construction and operates in the same way as the hopper 9 of the first embodiment. Preferably, each hopper 9' is operable independent of the other hoppers so that each may aspirate and/or dispense different quantities of powder from respective source vessels and destination receptacles. Further, a separate gas flow control system can be provided for each hopper 9 so that the gas flow velocity may be independently varied for each hopper. The hoppers may be ganged together in other ways and in other arrays. For example, an array of hoppers may be mounted on a common support, e.g., a common mounting plate or bracket, which in turn is attached to a single Z-axis rod of the robot.

Mixing Different Powders

In many cases, there will be a need to mix two or more different powdered materials to prepare a sample. In some cases the powders will need to be mixed stochastically to provide a heterogeneous mixture. But the present invention can be used to mix the powders to a lesser extent if that is all the mixing that is needed. In one embodiment, the present invention is generally designed for mixing a sample weighing about 5 grams or less. In another embodiment, the weight of the mixed sample is in the range of about 0.1 mg to about 5 grams. In another embodiment, the weight of the mixed sample is in the range of about 0.1 mg and 1 gram. In still another embodiment, the weight of the mixed sample is in the range of about 0.5 mg to about 1 gram. In yet another embodiment the weight of the mixed sample is in the range of about 5 mg to about 1 gram. In another embodiment, the weight of the mixed sample is less than about 50 mg. In another embodiment, the weight of the mixed sample is about 10 mg or less.

The powders may comprise particles of any size ranging from about 1 μm to about 1 mm. In one embodiment, the average size of the powder particles ranges from about 1 μm to about 400 μm. In another embodiment, the average size of the powder particles ranges from about 100 μm to about 400 μm. In another embodiment, the average size of the powder particles ranges from about 1 μm to about 100 μm. In yet another embodiment, the powders range in average particle size from about 1 μm to about 50 μm. In still another embodiment, the powders range in average particle size from about 1 μm to about 25 μm.

In general, a powder mixing process of the present invention involves transferring a quantity of a first powder to a mixing vessel and transferring a quantity of a second powder to the mixing vessel to form a powder bed in the vessel comprising the first and second powders. The quantities of the various different powders are generally selected so the mixed sample has a predetermined composition of powders. Any apparatus or methods for selecting the quantities of powder to achieve the predetermined composition can be used. In some embodiments, the quantities of the various powders are metered (either by weight or by volume) as described above. In other embodiments, any conventional metering system is used to meter the powders. It is also contemplated that two or more different powders could be purchased or otherwise obtained in pre-measured quantities without departing from the scope of this invention.

The powder bed is fluidized to mix the powders and produce a mixed sample. In some embodiments, the powders are mixed in a hopper 9 of the powder transfer system 1 described above. In these embodiments, the mixing vessel is the hopper 9. In other embodiments, the powders are mixed in a receptacle other than the hopper 9.

Mixing in Hopper

Figure 12:
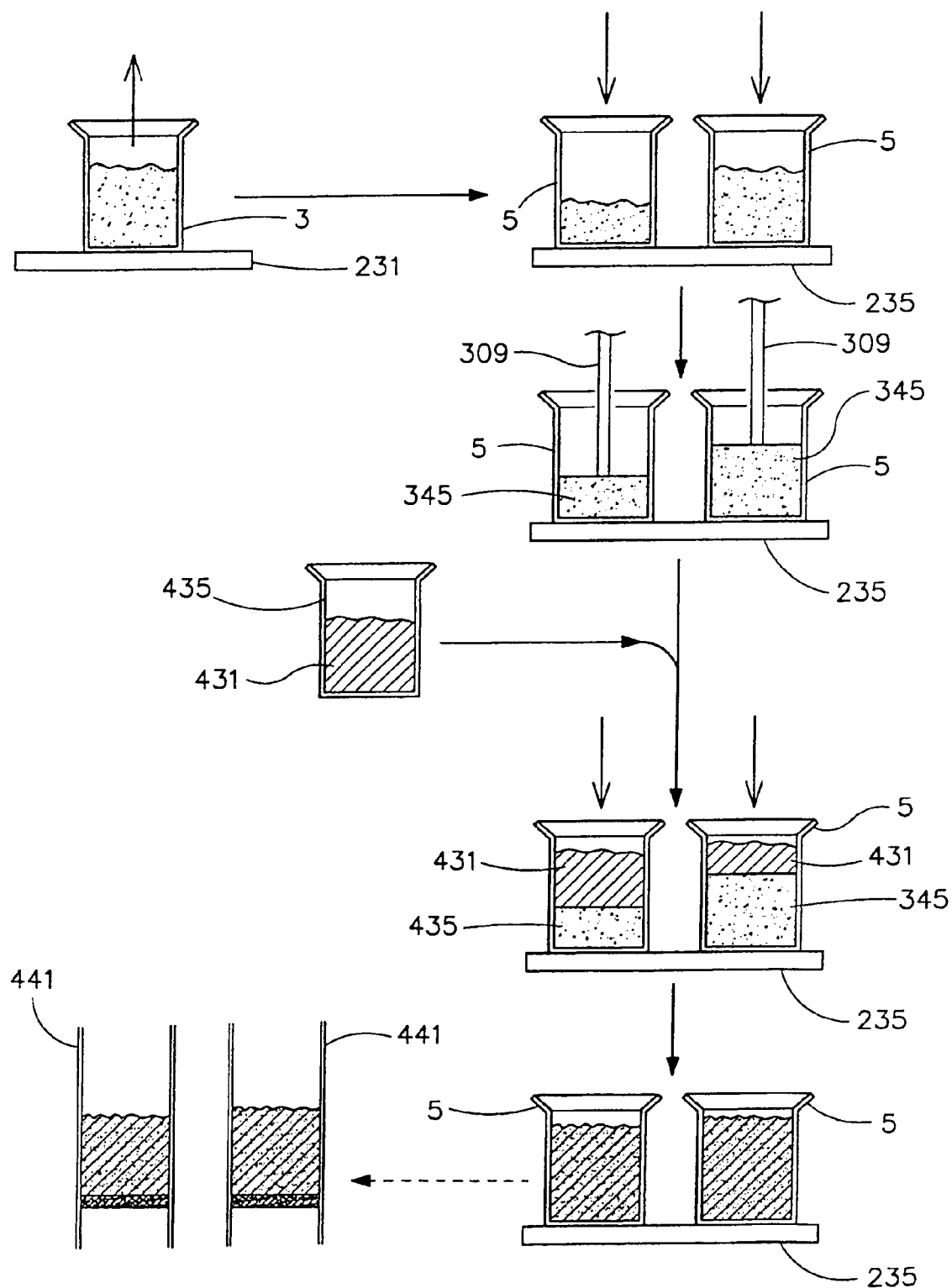
FIG. 12 is a work flow diagram illustrating the steps of a process using the apparatus.

FIG. 12 illustrates a work flow process in which the powder transfer system 1 is used to add a second powder material (e.g., a diluent) 431 from a vessel 435 to the materials in the destination receptacles 5 (only two of which are shown in schematic form) so that the materials in the receptacles 5 occupy the same final volume. In this process, powder (e.g., catalysis material) is aspirated from one or more source receptacles 3 (only one of which is shown in schematic form in FIG. 12) into the hopper 9 and dispensed into respective destination receptacles 5 in the same manner described above. Thereafter, the block 35 is raised by the positioning device 241 and the vibrator device 301 activated to effect settling (packing) of the powders in the receptacles 5. The block 35 is then repositioned on the second scale 235 and the probe 309 of the bed-height measuring device 305 is used to measure the height of each bed 345 in the manner described above. These measurements are used by the processor 25 to calculate, for example, the volume (V1) of powder in each receptacle 5 and the volume (V2) of second powder material (e.g., diluent 431) which needs to be added to each receptacle to bring the total volume of powder in each receptacle to the same stated final volume (V3). The hopper 9 is then used to aspirate this calculated quantity (V2) of second powder material 431 from the second powder source 435 and to dispense the second powder material into each destination receptacle 5 to bring the total volume of material contained in the receptacle to the preset final volume (V3). The bed-height information can also be used to determine other information, such as the density of the powder in each receptacle.

Figure 13:
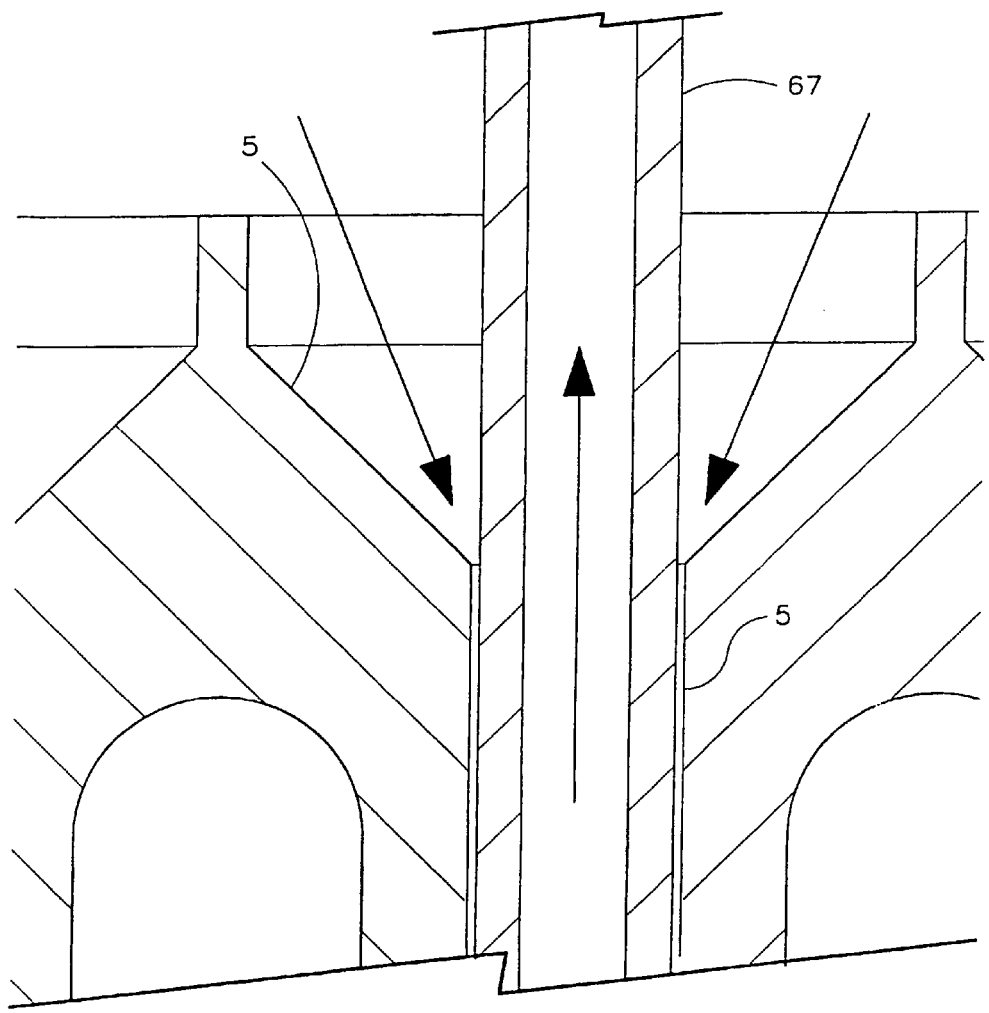
FIG. 13 is an enlarged view showing a portion of the transfer tube of the hopper positioned in a dispensing receptacle for a mixing operation.

Mixing is achieved by aspirating the two different powders into a hopper 9 from the receptacle 5, thereby transferring the powders to the hopper 9. In one exemplary embodiment, the hopper 9 used to mix the powders has a total volumetric capacity in the range of about 10 ml to about 20 ml. Of course a hopper having any size suitable for transferring powders, as described above, can also be used to mix powder. After aspiration the gas flow control 17 maintains the bed 221 of resultant powder fluidized for a mixing interval or duration sufficient to effect the desired mixing, and then reduces the flow of gas through the transfer port 11 to substantially 0.0 m/s, thereby causing the bed 221 to collapse to maintain the powders in a mixed condition. The mixture is then unloaded back into the same receptacle 5 from which it came, using the vibrator 181 to shake the hopper 9 to facilitate the flow of material through the transfer port 11. To ensure that all powder is aspirated from the receptacle 5 into the hopper 9 for mixing, it is preferable that the outside diameter of the transfer tube 67 be only nominally (slightly) smaller than the inside diameter of the receptacle 5 (FIG. 13). After the materials from each receptacle 5 are mixed, the hopper 9 is conveyed to the cleaning station 355 where the hopper 9 and transfer tube 67 are cleaned.

After all desired mixing has been completed, the block 35 is removed from the fork 265 of the positioning device 241 and conveyed (either manually or by a suitable automated transport mechanism) to a location where the mixtures are to be subjected to a further processing step or steps.

Mixing can be performed with a hopper in many different ways without departing from the scope of the invention. While two powders are dispensed into each of the destination receptacles 5 in the above example, it will be understood that more than two powders could be dispensed. Further, the number of powders dispensed into the receptacles can vary from receptacle to receptacle. Also, it is contemplated that the work flow described in FIG. 12, involving the steps of transferring powder (e.g., catalysis material) from one or more source vessels 3, dispensing the powder into an array of destination receptacles 5, weighing the dispensed amounts, packing the powder (optional), measuring the height of the beds 345 in the receptacles 5, adding a second powder (e.g., diluent 431) to the receptacles, and mixing the powders prior to a parallel reaction screening step, could be carried out by an automated solids handling and dispensing system other than a fluidized-bed transfer system of the type described herein. Two or more different powders could also be aspirated into a hopper 9 and mixed before the powders are dispensed to a receptacle 5.

Also, the powders will begin mixing as soon as they enter the hopper 9 so it is conceivable that the desired level of mixing could be achieved in some cases simply by aspirating the powders and then reducing the gas velocity to a level where the mixed powder drops from the hopper as soon as aspiration is complete. Further, it may not be necessary to collapse the powder bed during dispensing of the mixed powders from the hopper 9. If the powders have similar physical characteristics (i.e., about the same terminal velocity), the upward flow can be reduced to a dispensing velocity greater than 0.0 m/s to maintain the bed in a fluidized state as the powders are dispensed without causing significant stratification of the various powders during the dispensing step. Likewise, the dispensing velocity can be sufficient to maintain the powder bed in a fluidized state regardless of powder characteristics provided there is sufficient tolerance for any resulting stratification. Other variations are also readily apparent to one skilled in the art and do not depart from the scope of this invention.

Mixing in Generic Vessel

In another exemplary embodiment, the powders are loaded into a mixing vessel other than hopper 9. Referring to FIGS. 15–20, a powdered sample mixing system, generally designated 501, includes at least one such mixing vessel 503. The mixing vessel 503 has an open end 505 and a closed end 507. The exemplary vessel 503 has a generally cylindrical shape (as shown in FIGS. 15–19), but the mixing vessel could have practically any shape. In one embodiment the mixing vessel 503 has a total volumetric capacity of about 50 ml or less. In another embodiment, the mixing vessel has a total volumetric capacity of about 20 ml or less. In yet another embodiment, the mixing vessel has a total volumetric capacity in the range of about 0.1 ml to about 20 ml. In another embodiment, the total volumetric capacity of the mixing vessel is in the range of about 0.1 ml to about 10 ml. In another embodiment, the mixing vessel has a total volumetric capacity in the range of about 0.1 ml to about 2 ml. In yet another exemplary embodiment, the total volumetric capacity of the mixing vessel is in the range of about 0.1 ml to about 1 ml. In still another embodiment the mixing vessel has a total volumetric capacity corresponding to no more than about 5 grams of powder. In another exemplary embodiment, the mixing vessel has a capacity corresponding to no more than about 150 mg of powder.

Preferably, the size and shape of the mixing vessel 503 will be such that there will ample room for mixing of powders. For example, if the vessel 503 is cylindrical, it is desirable that its diameter be equal to or greater than the depth of the powder bed to be formed and mixed therein. Likewise, it is desirable that the vessel 503 have sufficient height (e.g., at least three time the height of the powder bed) to provide ample head space for fluidizing gas to circulate as will be described below.

Figure 15:
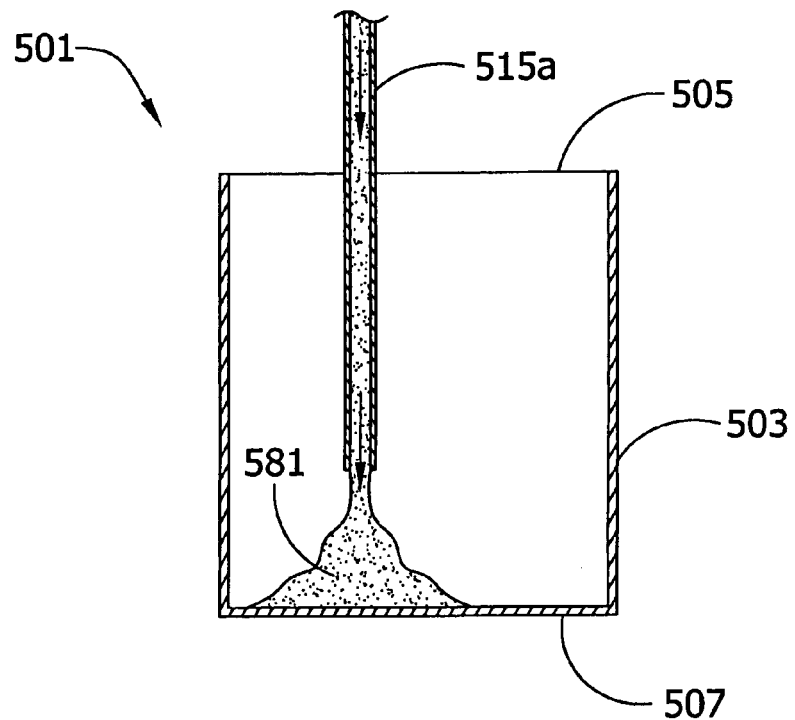
FIGS. 15–20 are schematic diagrams of apparatus and a corresponding workflow for mixing two or more powders in a mixing vessel according to one embodiment of the invention.
Figure 16:
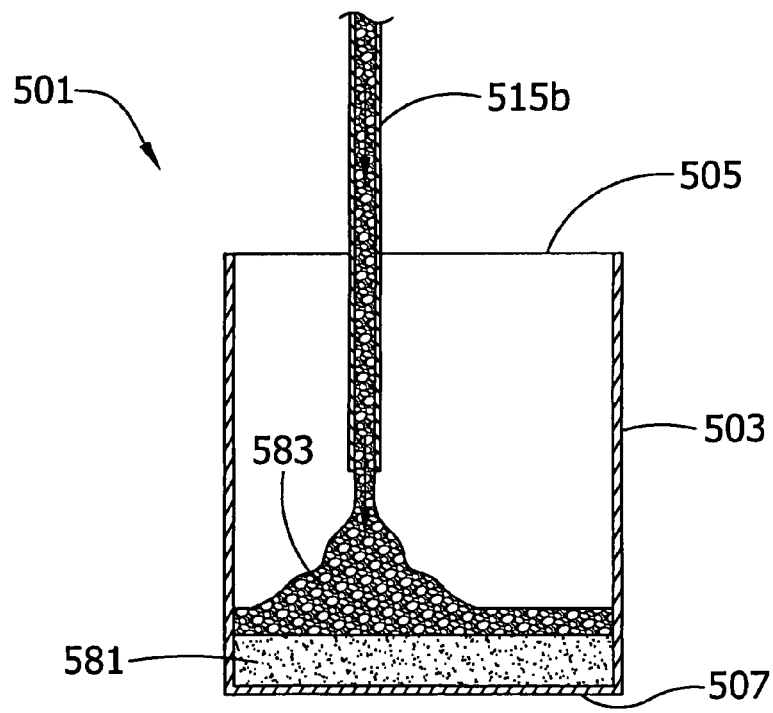

The mixing system 501 also includes a powder transfer system comprising at least one powder transfer device 515 (e.g., a powder pipette) for transferring two or more different powders to the mixing vessel 503. Preferably, the powder transfer system has a separate transfer device for each of the different powders (e.g., two different transfer devices 515*a*, 515*b* for mixing two different powders as shown in FIGS. 15–16). In one embodiment, the automated powder transfer system 1 described above is used to transfer powders to the mixing vessel 503, in which case the hoppers 9 serve as the transfer devices, but any powder transfer system can be used.

Figure 17:
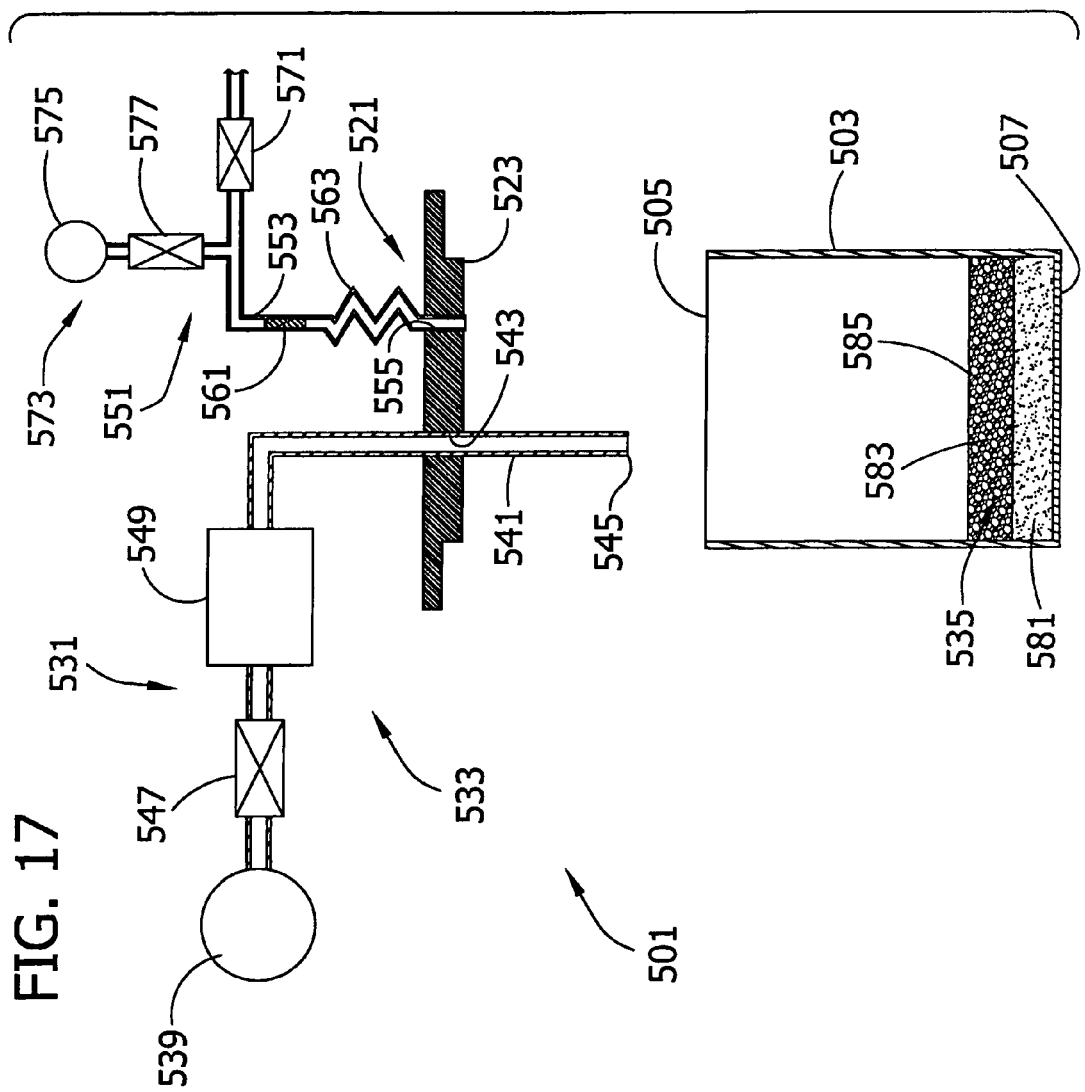
Figure 18:
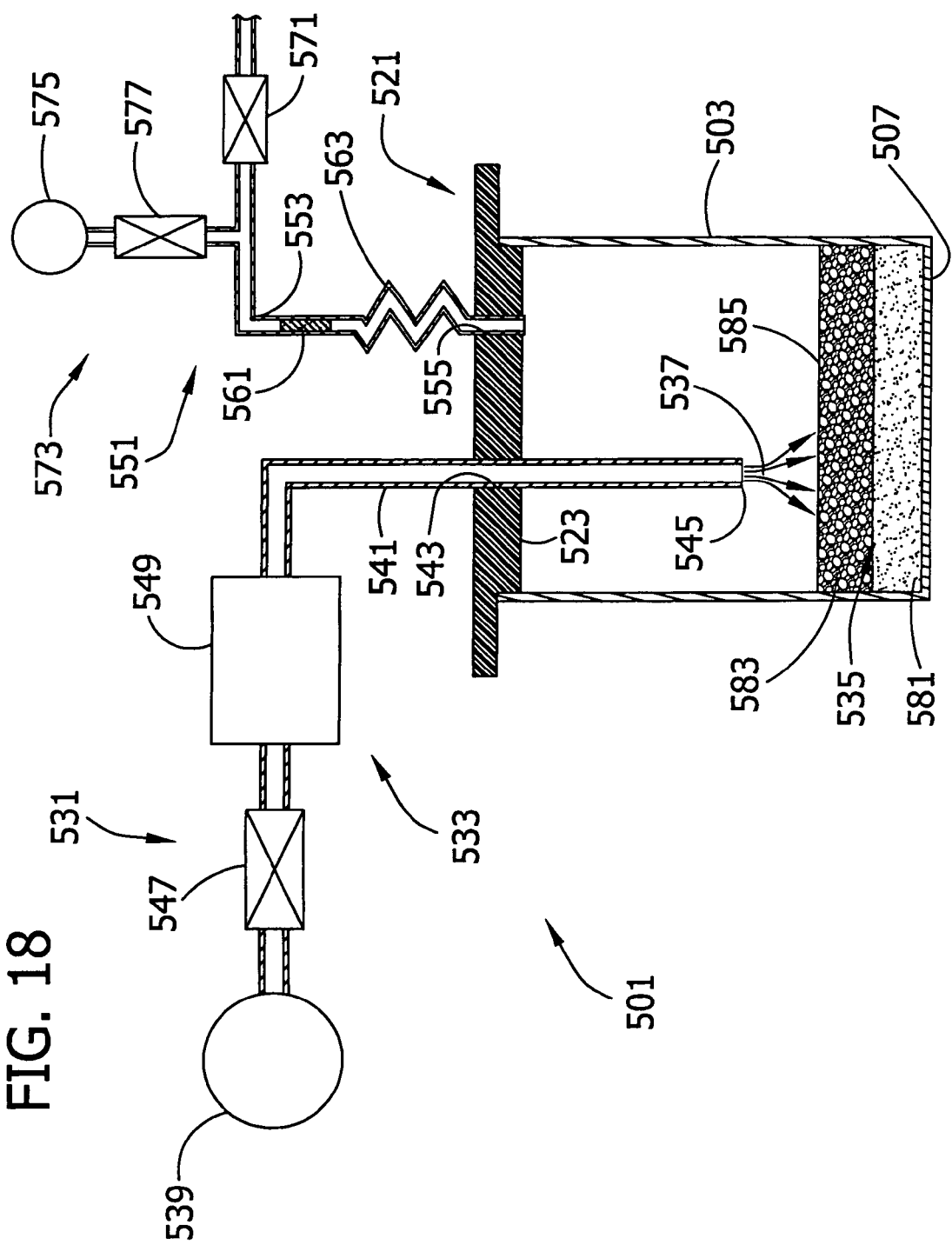
Figure 19:
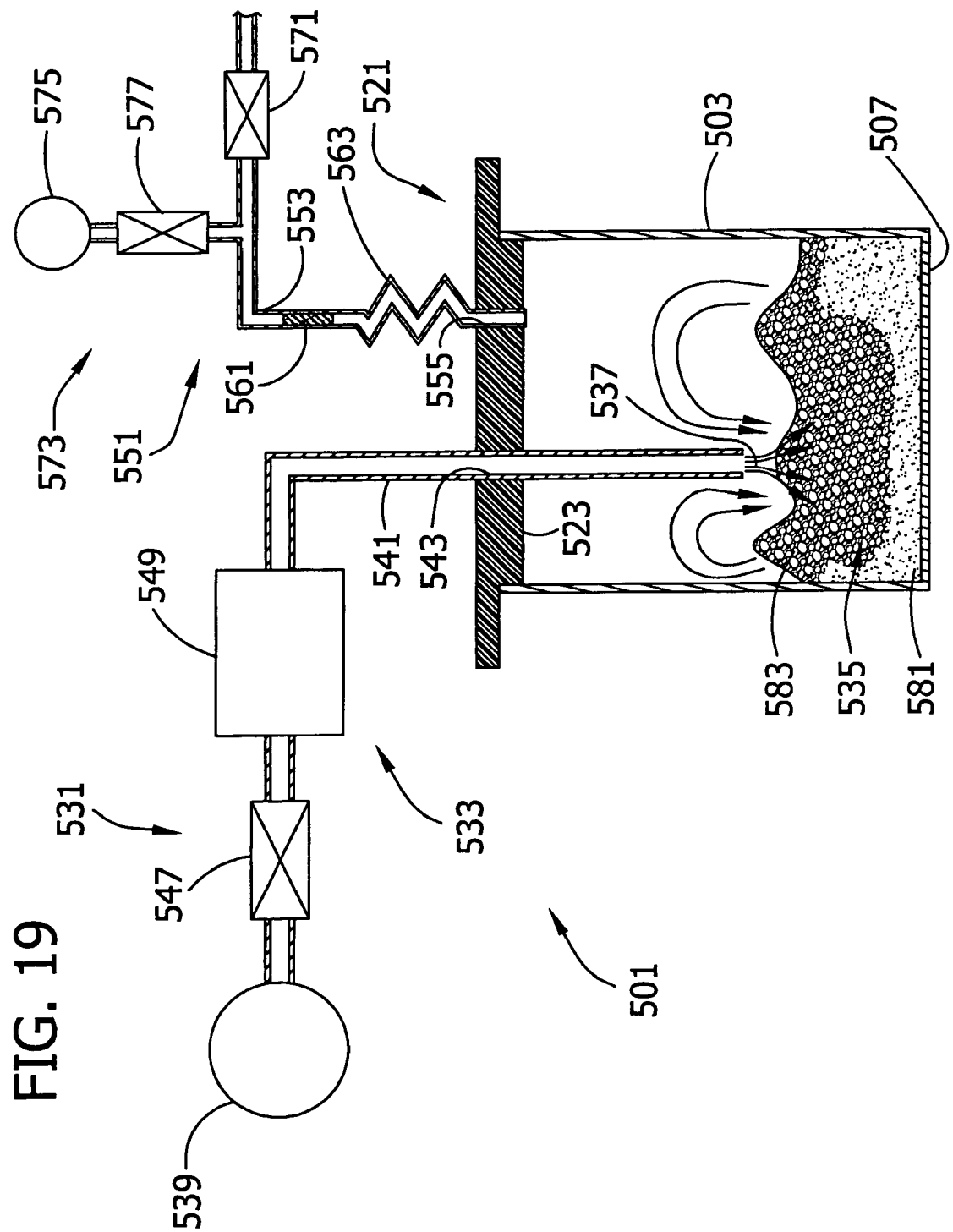
Figure 20:
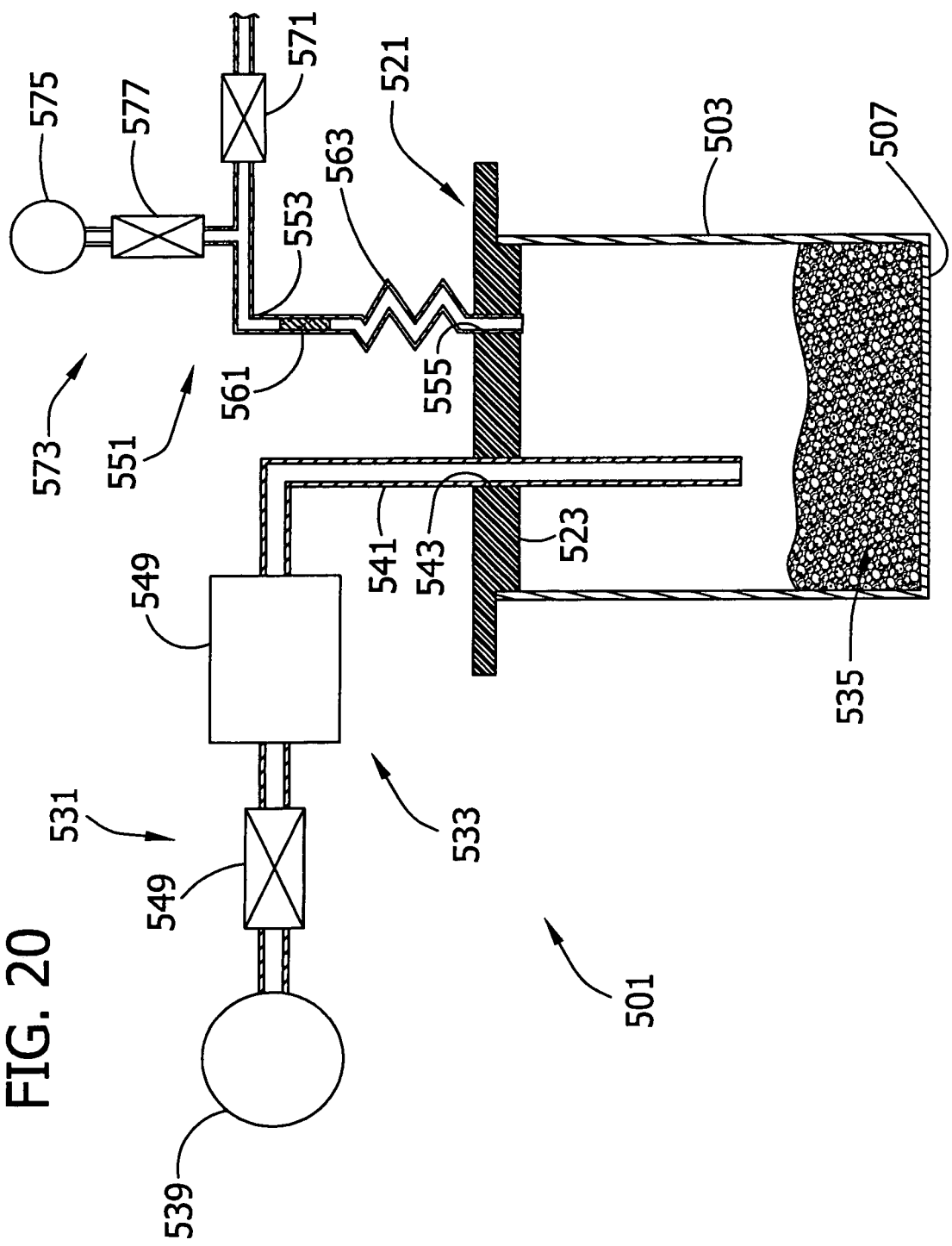

Referring to FIGS. 17–20, the mixing system 501 also includes a removable closure 521 moveable between an open position in which the closure 521 does not close the open end 505 of the mixing vessel 503 (FIG. 17) and a closed position in which the closure 521 closes the open end 505 of the vessel 503 (FIGS. 18–20). In the exemplary embodiment, the closure 521 has a boss 523 shaped to be received in the open end 505 of the mixing vessel 503. The boss 523 is provided to improve the seal between the removable closure 521 and the mixing vessel 503. Other sealing devices (e.g., O-rings and the like) could be used instead of or in addition to the boss 523 if desired. The closure 521 is preferably formed of a material comprising silicon rubber or similar material. The closure 521 may also have a Teflon® coating.

A powder bed fluidizing apparatus, generally designated 531, is provided for fluidizing a powder bed 533 formed in the mixing vessel 503. In the exemplary embodiment, the powder bed fluidizing apparatus 531 comprises a blowing apparatus 533 operable to fluidize the powder bed 535 in the mixing vessel 503 by blowing a stream of gas 537 into the mixing vessel 503. As shown schematically in FIGS. 17–20, the blowing apparatus 533 comprises a source of compressed gas 539 and a gas supply conduit 541 in communication therewith. In some cases it will be desirable to use compressed nitrogen or inert gas to inhibit chemical reactions between the gas and the powders (e.g., to inhibit oxidation of the powders), but in other cases compressed air will suffice. In one embodiment, the supply conduit comprises 22-gauge hypodermic needle tubing, but the optimal size will vary depending on the application. A valve 547 and flow meter/controller 549 are also plumbed into the gas supply conduit 541. The gas supply conduit 541 passes through an opening 543 in the removable closure 521. The opening 543 is sized and shaped so there are no gaps between the conduit 541 and opening 543. If desired, any conventional seal (not shown) can be used to seal the space between the conduit 541 and opening 543. When the removable closure 521 is in its closed position (FIG. 18) the downstream end 545 of the gas supply conduit 541 is inside the mixing vessel 503.

Referring to the exemplary embodiment (FIGS. 17–20), a vent system 551 is provided to vent gas from the mixing vessel 503 when the blowing apparatus 533 blows gas into the mixing vessel 503. The vent system 551 comprises a vent conduit 553 that passes through an opening 555 in the removable closure 521 in much the same way as the supply conduit 541. The vent conduit 553 is preferably comparable in diameter to the supply conduit 541 to prevent excessive pressure buildup in the vessel 503. A filter 561 is provided in the vent conduit 553 to inhibit movement of powder through the vent system 551. It is desirable for the pores in the filter 561 to be small enough to trap substantially all the powder particles. The vent conduit 553 includes a segment 563 shaped to define a tortuous path (e.g., a zigzag path as shown in FIGS. 17–20) which further inhibits movement of powder through the vent system 551. A valve 571 is plumbed into the vent conduit 553 to open and close the conduit 553. A selectively activatable source of compressed gas 573 is connected to the vent conduit 553 for backflushing the filter with gas. For example the selectively activatable source of compressed gas 573 may be a pressurized tank 575 having a shut-off valve 577.

FIGS. 15–20 show the steps in one exemplary workflow for preparing a mixed powder sample using the mixing system 501. First a powder transfer device 515*a* is used to dispense a quantity of a first powder 581 to the mixing vessel 503. Then a different powder transfer device 515*b* is used to dispense a quantity of a second powder 583 different from the first powder 581 into the mixing vessel 503. Consequently, an unmixed powder bed 535 comprising the first 581 and second 583 powders is formed in the mixing vessel 503. Referring to FIG. 17, for instance, the different powders 581, 583 are stratified in the powder bed 535 at this point. However, a powder bed is considered unmixed whenever the powders are not mixed to the degree desired, regardless of the extent of intermingling of the powders in the powder bed. Thus, any powder bed that is not a homogeneous powder mixture can be considered an unmixed powder bed. Similarly, a sample is considered a mixed sample when the desired level of mixing has been achieved even if the mixing is not entirely homogeneous.

Next, the closure 521 is moved from its open position (FIG. 17) to its closed position (FIG. 18). The valve 547 in the gas supply conduit 541 and the valve 571 in the vent conduit 553 are opened and compressed gas is directed through the gas supply conduit 541 from the source 539 to the mixing vessel 503. A gas stream 537 exits the end 545 of the conduit 541 in the mixing vessel 503. There the gas stream 537 is blown into an upper surface 585 of the powder bed 535 (FIG. 18). The gas stream 537 passes into or penetrates the powder bed 535, thereby fluidizing the powder bed 535 and mixing the powders. For instance, the powders may swirl around in the bottom of the vessel as the gas 537 moves through the powder bed 535 and the space above the powder bed (FIG. 19). If the powders comprise smaller or lighter particles, they may become suspended and fill the vessel with a swirling cloud of powders.

The required velocity for the gas stream 537 will vary depending on a number of factors including the size and shape of the powder bed, the physical characteristics of the powders, and the geometry of the mixing vessel. Preferably, the velocity or mass flow rate of the gas stream is sufficient to fluidize the entire powder bed 535 at the same time. It is also preferable that the gas stream 537 be strong enough that there are substantially no dead zones in the powder bed 535. In one embodiment, for example, the gas flow rate through 22 guage needle tubing is between about 3 and 1 about 5 scfm. Meanwhile gas is vented from the mixing vessel 503 through the vent to prevent excessive pressure buildup in the mixing vessel 503. Fluidization of the powder bed 535 is continued until the desired degree of mixing is achieved.

After mixing, the valve 547 in the gas supply conduit 541 and the valve 571 in the vent conduit 553 are closed. Optionally, the selectively activatable compressed gas source 573 can be activated by opening the valve 577 to temporarily establish a reverse flow of gas through the vent system 551 and blow any powder stuck on the filter 561 off the filter. An optional vibrator or tapping mechanism (not shown), such as an eccentric motor similar to the eccentric motor 181 described above in connection with the hoppers 9 of the transport system 1, can also be used to shake powder off the sides of the vessel 503.

The foregoing apparatus and methods for mixing may be varied in many ways without departing from the scope of this invention. Although only one mixing vessel 503 is shown in FIGS. 15–20, the mixing vessel 503 can be just one mixing vessel in an array of mixing vessels. The mixing vessel 503 can be one of the receptacles 5 in the block 35, for instance. If the mixing vessel 503 is one vessel in an array of mixing vessels, the removable closure 521 may be a Capmat (i.e., a pierceable sheet of EVA or silicon having a plurality of bosses arranged in a geometric configuration corresponding to the configuration of the array for snapping a boss into the open end of each reaction vessel). Capmats can be obtained from a variety of commercial sources such as Greiner Bio-One Inc., of Longwood, Fla. Each vessel could also have its own removable closure such as a cap including a pierceable septum and a cap ring (threaded or snapable) for securing the septum over the open end 505 of the mixing vessel 503.

When mixing powders in an array of vessels, the mixing system could be adapted to mix the samples simultaneously or sequentially. For instance, the removable closure could be a moveable head adapted to move into position to seal the open ends of all the mixing vessels in the array and blow gas into them simultaneously using either a gas supply manifold or a plurality of separate gas conduits. The blowing apparatus could also be adapted to move from vessel to vessel for sequential mixing. For example, the gas supply conduit 541 and vent conduit 553 can comprise non-coring hollow hypodermic needles (e.g., 22-gauge hypodermic needles) which pierce the closure 521 as a human or robot (e.g., a Cavro® robot) moves them from one vessel to the next.

The exemplary blowing apparatus can be modified if desired to help eliminate dead spots (i.e., areas of relative stagnation) in the mixing vessel during fluidization of the powder bed or to speed up the mixing process. For example, the blowing apparatus may comprise a plurality of conduits for blowing gas into one of the mixing vessels. Further, the conduits can be arranged in a variety of configurations (e.g., a circular ring, an irregular pattern, or any other configuration). The optimal configuration will vary depending on the geometry of the mixing vessel and many other factors. The terminal end of one or more conduits can be at a different elevation than the terminal end of one or more other conduits. Moreover, the terminal end of one or more conduits can be raised and/or lowered during the fluidization step. One or more conduits can be designed to point a stream of gas in a different direction than one or more of the other gas streams. One or more conduits can be designed to move (e.g., orbit, rotate, or translate linearly) to change the direction of the gas jet during the fluidization step. Furthermore, the rate of gas flow through one or more conduits may be varied (e.g., pulsed) during the fluidization step. For instance, the gas stream may be supplied in short bursts. If there are multiple conduits, a series of bursts can be applied (alternately or simultaneously) by any two or more conduits. Any of the foregoing modifications can be made in combination with any of the other modifications.

Once the samples have been mixed, regardless of how mixing is achieved, they can be subjected to any desired further processing or analysis, such as a parallel fixed bed screening operation using parallel fixed beds 441 (FIG. 12), such as disclosed in U.S. Pat. No. 6,149,882 to Guan et al., U.S. Pat. Appln. Pub. No. 2002-0170976 to Bergh et al., U.S. Pat. Appln. Pub. No. 2002-0048536 to Bergh et al., U.S. Pat. Appln. Pub. No. 2002-0045265 to Bergh et al., and U.S. Pat. Appln. Pub. No. 2002-0042140 to Hagemeyer et al., each of which is hereby incorporated by reference in its entirety for all purposes. Such further processing may involve transferring the mixtures to separate vessels. Alternatively, the mixtures may be retained in the same receptacles 5 (e.g., the wells 5 in the block 35).

It will be observed from the foregoing that the transfer system 1 of this invention represents an improvement over prior art transfer techniques. The system described herein is capable of efficiently transferring small quantities powder from one location to another and dispensing measured quantities of such powders into an array of destination vessels swiftly and accurately. Further, the powder is handled gently and not subjected to harsh crushing forces which might adversely affect one or more physical characteristics (e.g., size) of the particles. Likewise, any number of relatively small mixed powder samples can be prepared efficiently and accurately. The system is also flexible in accommodating a wide variety of source and destination configurations, including one-to-one transfers, one-to-many transfers, and many-to-many transfers. Having both aspirate and dispense functionalities, it can also start over and redispense if it overdispenses on the first try. The system can readily be scaled up or down to different sizes, according to need. Further, the system is capable of handling a wide range of powders having different particle sizes and flow characteristics. The system is particularly suited for applications where accuracy and repeatability are important, as in the pharmaceutical, parallel synthesis and materials research industries.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawing shall be interpreted as illustrative and not in a limiting sense.

What is claimed is:

1. A method of preparing a sample by mixing two or more different powders, the method comprising the steps of:

transferring a quantity of a first powder to a mixing vessel;

transferring a quantity of a second powder different from the first powder to the mixing vessel to form a powder bed in the vessel comprising said quantities of first and second powders; and fluidizing the powder bed to mix the powders and produce a mixed sample, wherein the mixed sample weighs about 5 grams or less, and wherein said quantities of first and second powders are selected so the mixed sample has a predetermined ratio of first powder to second powder.

2. The method of claim 1 wherein the mixed sample weighs between about 0.1 mg and about 1.0 gram.

3. The method of claim 1 further comprising the step of metering said quantities of first and second powders.

4. The method of claim 3 further comprising using a processor to automatically perform the metering and transferring steps.

5. The method of claim 1 wherein the step of fluidizing the powder bed comprises causing gas to flow into the powder bed.

6. The method of claim 1 wherein the step of fluidizing the powder bed comprises causing a substantially oxygen-free gas to flow into the powder bed.

7. The method of claim 1 further comprising pressing at least a portion of the mixed sample into a tablet.

8. The method of claim 7 wherein the tablet contains substantially only the mixed sample.

9. The method of claim 1 wherein the mixed sample is a pharmaceutical sample.

10. The method of claim 1 wherein the mixed sample is a pigment sample.

11. The method of claim 1 wherein the mixed sample is an agri-chemical sample.

12. The method of claim 1 wherein the mixed sample is a catalyst sample.

13. The method of claim 1 wherein the mixed sample is a food sample.

14. The method of claim 1 wherein the mixed sample is a beverage sample.

15. The method of claim 1 wherein both of the transferring steps comprise aspirating a respective powder into the mixing vessel.

16. The method of claim 15 wherein the mixing vessel comprises a hopper having at least one transfer port, and wherein the aspirating steps comprise establishing a flow of gas into the hopper through the transfer port at an aspirating velocity, said aspirating velocity being sufficient to entrain the respective powder in the gas and to aspirate the entrained powder into the hopper.

17. The method of claim 16 wherein said transfer port is located at a lower end of the hopper, and wherein said aspirating steps further comprise aspirating the respective powders to a location in the hopper above the transfer port, thereby forming said powder bed above the transfer port.

18. The method of claim 17 wherein the step of fluidizing the powder bed comprises maintaining said upward flow of gas into the hopper at a holding velocity after formation of the powder bed, said holding velocity being sufficient to fluidize the powder bed and to prevent the powders from falling out of the hopper through the transfer port.

19. The method of claim 18 further comprising maintaining said upward flow of gas until the powder bed is mixed stochastically.

20. The method of claim 18 further comprising dispensing the mixed sample to a destination vessel.

21. The method of claim 20 wherein the dispensing step comprises moving the hopper to a location above the destination vessel and reducing the velocity of said upward flow of gas to a dispensing velocity, said dispensing velocity being insufficient to prevent powder from falling out of the hopper through the transfer port.

22. The method of claim 20 wherein the dispensing step comprises reducing the velocity of said upward flow of gas to substantially 0.0 m/s to collapse the powder bed.

23. The method of claim 20 wherein the powder bed is a first powder bed and the mixed sample is a first mixed sample, the method further comprising after the dispensing step:

transferring an additional quantity of the first powder to the hopper;

transferring an additional quantity of the second powder to the hopper, thereby forming a next powder bed in the mixing vessel comprising the additional quantities of first and second powders; and fluidizing said next powder bed to mix the powders and produce a next mixed sample, wherein said next mixed sample weighs about 5 grams or less and the additional quantities of the first and second powders are selected so said next sample will have a predetermined ratio of first powder to second powder.

24. The method of claim 23 wherein the predetermined ratio of first powder to second powder for said next mixed sample is different from the predetermined ratio for the first mixed sample.

25. The method of claim 23 further comprising metering said additional quantities of the first and second powders.

26. The method of claim 1 wherein said powder bed formed in the mixing vessel by said transfer steps is an unmixed powder bed.

27. The method of claim 1 wherein the transferring steps comprise using at least one transfer device to transfer the powders to the mixing vessel.

28. The method of claim 27 wherein the step of using at least one transfer device comprises using a first transfer device to transfer the first powder to the mixing vessel and using a second transfer device to transfer the second powder to the mixing vessel.

29. The method of claim 1 wherein the mixing vessel has an open end and a closed end, the method further comprising placing a removable closure over the open end and blowing gas into the mixing vessel to fluidize the powder bed.

30. The method of claim 29 wherein the blowing step comprises blowing gas through a gas supply conduit into the mixing vessel.

31. The method of claim 29 wherein the blowing step comprises blowing a stream of gas into an upper surface of the powder bed.

32. The method of claim 31 wherein the blowing step further comprises blowing said stream of gas at a velocity sufficient to fluidize the entire powder bed at the same time.

33. The method of claim 29 wherein the blowing step comprises continuing to blow gas into the mixing vessel until the powder bed is mixed stochastically.

34. The method of claim 29 further comprising venting gas from the mixing vessel through a vent during said blowing step.

35. The method of claim 34 wherein the venting step comprises passing gas through a filter in the vent to inhibit flow of the powders through the vent.

36. The method of claim 1 wherein the mixing vessel is a first mixing vessel, the powder bed is a first powder bed, and the mixed sample is a first mixed sample, the method further comprising:
- transferring an additional quantity of the first powder to a next mixing vessel different from the first mixing vessel;
- transferring an additional quantity of the second powder to said next mixing vessel, thereby forming a next powder bed comprising the additional quantities of first and second powders in said next mixing vessel; and
- fluidizing said next powder bed in said next mixing vessel to produce a next mixed sample,
- wherein said next sample weighs about 5 grams or less and wherein said quantities of the first and second powders are selected so said next mixed sample will have a predetermined ratio of first powder to second powder.

37. The method of claim 36 wherein the predetermined ratio of first powder to second powder for said next sample is different from the predetermined ratio for the first sample.

38. The method of claim 36 further comprising metering the additional quantities of powder.

39. A powder handling system for preparing at least one sample by mixing two or more powders, the system comprising:
- at least one mixing vessel having a total volumetric capacity of about 50 ml or less, said mixing vessel having an open end and a closed end;
- a powder transfer system for transferring quantities of two or more different powders to the mixing vessel to form an unmixed powder bed in the mixing vessel comprising said powders;
- a powder bed fluidizing apparatus for fluidizing the powder bed to mix the powders and produce a mixed sample in the mixing vessel; and
- a removable closure adapted for closing the open end of the mixing vessel during mixing of the powders.

40. The system of claim 39 wherein said powder transfer system comprises an automated powder transfer system.

41. The system of claim 39 wherein said total volumetric capacity of the mixing vessel is about 20 ml or less.

42. The system of claim 39 further comprising a metering system operable to meter said quantities of the different powders transferred into the at least one mixing vessel.

43. The system of claim 42 wherein the metering system and transferring system are under the control of a processor, said processor being operable to automatically meter and transfer said quantities of the different powders to the at least one mixing vessel.

44. The system of claim 39 wherein the powder bed fluidizing apparatus comprises blowing apparatus for blowing gas into the at least one mixing vessel.

45. The system of claim 44 wherein the blowing apparatus is operable to blow a stream of gas into the resting powder bed through an upper surface of the powder bed.

46. The system of claim 45 wherein the blowing apparatus is operable to blow said stream of gas at a velocity sufficient to fluidize the entire powder bed at the same time.

47. The system of claim 44 wherein the blowing apparatus comprises a source of compressed gas and a gas supply conduit in fluid communication with the source of compressed gas.

48. The system of claim 47 wherein said gas supply conduit is adapted to establish a flow of compressed gas through said removable closure when the closure is closing the open end of said at least one vessel.

49. The system of claim 44 further comprising a vent for venting gas from the at least one vessel when the blowing apparatus blows gas into the vessel.

50. The system of claim 49 further comprising a filter in the vent.

51. The system of claim 49 further comprising a selectively activatable source of compressed gas adapted for fluid communication with the vent upstream of the filter for temporarily establishing a reverse flow of gas through the filter.

52. The system of claim 49 wherein the vent comprises a conduit defining a tortuous flow path for inhibiting flow of powder through the vent.

53. A powder handling system for preparing at least one sample by mixing two or more powders, the system comprising:
- at least one mixing vessel having a maximum capacity of about 5 grams of powder or less, said mixing vessel having an open end and a closed end;
- a powder transfer system for transferring quantities of two or more different powders to the mixing vessel, thereby forming a powder bed in the mixing vessel comprising said powders;
- a powder bed fluidizing apparatus for fluidizing the powder bed to mix the powders and produce a mixed sample in the mixing vessel; and
- a removable closure adapted for closing the open end of the mixing vessel during mixing of the powders.

* * * * *